US011627289B1

(12) United States Patent
Siminoff

(10) Patent No.: US 11,627,289 B1
(45) Date of Patent: Apr. 11, 2023

(54) ACTIVATING SECURITY SYSTEM ALARMS BASED ON DATA GENERATED BY AUDIO/VIDEO RECORDING AND COMMUNICATION DEVICES

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/135,861

(22) Filed: Sep. 19, 2018

Related U.S. Application Data

(60) Provisional application No. 62/560,659, filed on Sep. 19, 2017.

(51) Int. Cl.
| | |
|---|---|
| *H04N 7/18* | (2006.01) |
| *G08B 13/196* | (2006.01) |
| *G06F 21/32* | (2013.01) |
| *G10L 15/08* | (2006.01) |
| *G06V 40/16* | (2022.01) |

(Continued)

(52) U.S. Cl.
CPC ............ *H04N 7/188* (2013.01); *G06F 21/32* (2013.01); *G06V 40/1365* (2022.01); *G06V 40/172* (2022.01); *G06V 40/197* (2022.01); *G08B 13/19602* (2013.01); *G08B 13/19656* (2013.01); *G10L 15/08* (2013.01)

(58) Field of Classification Search
CPC ............... H04W 12/06; G02B 27/0176; H04L 12/2825; H04N 7/183; H04N 7/186
See application file for complete search history.

(56) References Cited

U.S. PATENT DOCUMENTS

| | | | |
|---|---|---|---|
| 4,764,953 | A | 8/1988 | Chern et al. |
| 5,428,388 | A | 6/1995 | von Bauer et al. |
| 5,760,848 | A | 6/1998 | Cho |

(Continued)

FOREIGN PATENT DOCUMENTS

| | | |
|---|---|---|
| CN | 2585521 Y | 11/2003 |
| CN | 2792061 Y | 6/2006 |

(Continued)

*Primary Examiner* — Peet Dhillon
(74) *Attorney, Agent, or Firm* — Lee & Hayes, P.C.

(57) ABSTRACT

Activating security system alarms based on data generated by audio/video (A/V) recording and communication devices in accordance with various embodiments of the present disclosure are provided. In one embodiment, an network device communicatively coupled to a security system in an armed mode is provided, the network device comprising: one or more processors; a communication module; and a non-transitory machine-readable memory storing a program comprising sets of instructions for: receiving sensor data indicative of an entry/exit event at an entry point; determining, based on at least one of motion data and image data generated by an A/V recording and communication device having a field of view, whether a person was present in the field of view of the A/V recording and communication device prior to the entry/exit event; determining whether the person is authorized; and upon determining that the person is not authorized, activating an alarm action of the security system.

22 Claims, 15 Drawing Sheets

(51) Int. Cl.
*G06V 40/18* (2022.01)
*G06V 40/12* (2022.01)

(56) References Cited

U.S. PATENT DOCUMENTS

| | | | |
|---|---|---|---|
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,872,915 B1 | 5/2014 | Scalisi et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Scalisi | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi | |
| 9,179,108 B1 | 11/2015 | Scalisi | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 10,249,158 B1* | 4/2019 | Jordan, II | G08B 7/062 |
| 2002/0071033 A1* | 6/2002 | Gutta | G07C 9/37 348/E7.086 |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2005/0219360 A1* | 10/2005 | Cusack | G07C 9/257 348/156 |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2007/0008081 A1 | 1/2007 | Tylicki et al. | |
| 2007/0182540 A1* | 8/2007 | Marman | G06V 20/52 340/541 |
| 2010/0225455 A1 | 9/2010 | Claiborne et al. | |
| 2011/0102588 A1* | 5/2011 | Trundle | G08B 13/19634 348/143 |
| 2012/0086568 A1* | 4/2012 | Scott | G08B 13/00 340/501 |
| 2013/0057695 A1 | 3/2013 | Huisking | |
| 2014/0267716 A1* | 9/2014 | Child | H04N 7/186 348/143 |
| 2015/0163463 A1 | 6/2015 | Hwang et al. | |
| 2016/0027262 A1* | 1/2016 | Skotty | G08B 13/19695 340/541 |
| 2016/0063235 A1* | 3/2016 | Tussy | H04W 12/06 726/6 |
| 2016/0307380 A1* | 10/2016 | Ho | G07C 9/00309 |
| 2018/0047267 A1* | 2/2018 | Modestine | H04N 5/23293 |
| 2018/0349684 A1* | 12/2018 | Bapat | G08B 13/19645 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

\* cited by examiner

ACTIVATING SECURITY SYSTEM ALARMS BASED ON DATA GENERATED BY AUDIO/VIDEO RECORDING AND COMMUNICATION DEVICES

CROSS-REFERENCE TO RELATED APPLICATION

This application claims priority to provisional application Ser. No. 62/560,659, filed on Sep. 19, 2017, the entire contents of which are hereby incorporated by reference.

TECHNICAL FIELD

The present embodiments relate to security systems, including security systems that include sensors, automation devices, and/or audio/video (A/V) recording and communication devices. In particular, the present embodiments relate to improvements in the functionality of security systems that strengthen the ability of such systems to reduce crime and enhance public safety.

BACKGROUND

Home safety is a concern for many homeowners and renters. Those seeking to protect or monitor their homes often wish to be informed of breaches to the security of their homes and also have video and audio communications with visitors/trespassers, for example, those visiting/trespassing near an external door or entryway. Security systems that include sensors, automation devices, and/or A/V recording and communication devices, such as doorbells, provide this functionality, and can also aid in crime detection and prevention. For example, sensor information, audio, and/or video captured by a security system, such as by an A/V recording and communication doorbell of a security system, can be uploaded to the cloud and recorded on a remote server. Subsequent review of the sensor information and/or the A/V footage can aid law enforcement in capturing perpetrators of home burglaries and other crimes. Further, the presence of a security system including one or more an A/V recording and communication devices on the exterior of a home, such as a doorbell unit at the entrance of a home, acts as a powerful deterrent against would-be burglars.

SUMMARY

The various embodiments of the present activating security system alarms based on data generated by audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that many security systems, other than the present embodiments, activate the alarm when a door/window is opened from the inside or the outside during an armed stay mode (e.g., when the alarm is armed and the residents of the property are inside), because the security systems are not configured to make the determination of whether the door/window opening is indicative of an entry event (e.g., a person opening the door/window from outside of the property) or an exit event (e.g., a person opening the door/window from inside of the property). Because many security systems, other than the present embodiments, are not configured to make this determination, and because the user/owner may desire to sound the alarm when the door is opened from the outside (e.g., because it may be indicative of an intruder), the alarm is activated in response to any door/window opening event when the security system is in an armed stay mode. However, the user/owner of the security system may not desire to have the alarm activated in response to the door/window being opened from the inside, especially by one of the residents, because the resident may be performing a routine task (e.g., taking out the trash, walking the dog, getting the mail, opening the window for air flow, etc.) and may have forgotten to disarm the security system prior to opening the door/window.

The present embodiments solve this problem by leveraging the functionality of A/V recording and communication devices (e.g., video doorbells, security cameras, floodlight cameras, etc.) having fields of view of the area exterior to and about the door/window to make a determination of whether a person was present in the field of view of the A/V recording and communication device prior to the entry event or the exit event. For example, if a person was not present in the field of view of the A/V recording and communication device prior to the entry event or the exit event, then the event is likely an exit event (e.g., a person opening the door from the inside), and the security system may be configured to react differently to an exit event than to an entry event. In one example, the security system may activate an alarm delay (similar to the alarm delay in an armed away mode) for an exit event to allow the resident time to disarm the security system, but may automatically and/or immediately sound the alarm for an entry event (e.g., where it is determined that a person was present in the field of view of the A/V recording and communication device prior to the exit or entry event). As a result, the user/owner of the security system may be more likely to activate the security system, especially to an armed stay mode, knowing that an exit event will not automatically trigger an alarm action. Because the user/owner may be more likely to activate the alarm, the safety and security of the property and the residents/occupants of the property is increased, contributing to public safety as a whole.

In a first aspect, a network device communicatively coupled to a security system in an armed mode, comprises: one or more processors; a communication module; and a non-transitory machine-readable memory storing a program, the program executable by at least one of the processors, the program comprising sets of instructions for: receiving, using the communication module, from a sensor of the security system, sensor data indicative of an entry/exit event at an entry point of a property where the security system is located; in response to receiving the sensor data, determining, based on at least one of motion data and image data generated by an A/V recording and communication device installed at the property and having a field of view including an area exterior to the property and in the proximity of the entry point, whether a person was present in the field of view of the A/V recording and communication device prior to the entry/exit event; based on the determination that a person was not present in the field of view of the A/V recording and communication device prior to the entry/exit event, initiating an alarm delay; when a disarming action is received prior to the completion of the alarm delay, disarming the security system; and when the disarming action is not received prior to the completion of the alarm delay, activating an alarm action of the security system.

In an embodiment of the first aspect, the sensor is a contact sensor.

In another embodiment of the first aspect, the network device is a hub device of the security system.

In another embodiment of the first aspect, the network device is a backend device.

In another embodiment of the first aspect, the backend device is a server.

In another embodiment of the first aspect, the program further includes sets of instructions for: retrieving, using the communication module, from the A/V recording and communication device, at least one of the motion data and the image data.

In another embodiment of the first aspect, the program further includes sets of instructions for: receiving, using the communication module, from the A/V recording and communication device, at least one of the motion data and the image data.

In another embodiment of the first aspect, the alarm action includes at least one of sounding an alarm, contacting law enforcement, contacting a security monitoring service, and generating and transmitting a user alert to a client device associated with the security system.

In another embodiment of the first aspect, determining whether a person was present in the field of view of the A/V recording and communication device prior to the entry/exit event includes analyzing the image data using computer vision.

In another embodiment of the first aspect, the computer vision includes at least one of object recognition, object detection, facial recognition, and facial detection.

In another embodiment of the first aspect, the armed mode is an armed stay mode.

In another embodiment of the first aspect, the A/V recording and communication is one of a video doorbell, a security camera, a floodlight camera, and a spotlight camera.

In a second aspect, a method is provided for a security system in an armed mode, the security system including a sensor installed at an entry point of a property and an audio/video (A/V) recording and communication device having a field of view including an area exterior to the property and in the proximity of the entry point, the method comprising: receiving, from the sensor, sensor data indicative of an entry/exit event at the entry point; in response to receiving the sensor data, determining, based on at least one of motion data and image data generated by the A/V recording and communication device, whether a person was present in the field of view of the A/V recording and communication device prior to the entry/exit event; based on the determination that a person was not present in the field of view of the A/V recording and communication device prior to the entry/exit event, initiating an alarm delay; when a disarming action is received prior to the completion of the alarm delay, disarming the security system; and when the disarming action is not received prior to the completion of the alarm delay, activating an alarm action of the security system.

In an embodiment of the second aspect, the sensor is a contact sensor.

In another embodiment of the second aspect, the method is executed by a hub device.

In another embodiment of the second aspect, the method is executed by a backend device.

In another embodiment of the second aspect, the backend device is a server.

In another embodiment of the second aspect, the method further comprises: retrieving, from the A/V recording and communication device, at least one of the motion data and the image data.

In another embodiment of the second aspect, the alarm action includes at least one of sounding an alarm, contacting law enforcement, contacting a security monitoring service, and generating and transmitting a user alert to a client device associated with the security system.

In another embodiment of the second aspect, determining whether a person was present in the field of view of the A/V recording and communication device prior to the entry/exit event includes analyzing the image data using computer vision.

In another embodiment of the second aspect, the computer vision includes at least one of object recognition, object detection, facial recognition, and facial detection.

In another embodiment of the second aspect, the armed mode is an armed stay mode.

In another embodiment of the second aspect, the A/V recording and communication is one of a video doorbell, a security camera, a floodlight camera, and a spotlight camera.

In a third aspect, a method is provided for a security system in an armed mode, the security system including a sensor installed at an entry point of a property and an audio/video (A/V) recording and communication device having a field of view including an area exterior to the property and in the proximity of the entry point, the method comprising: receiving, from the sensor, sensor data indicative of an entry/exit event at the entry point; in response to receiving the sensor data, determining, based on at least one of motion data and image data generated by the A/V recording and communication device, whether a person was present in the field of view of the A/V recording and communication device prior to the entry/exit event; and based on the determination that a person was present in the field of view of the A/V recording and communication device prior to the entry/exit event, activating an alarm action of the security system.

In an embodiment of the third aspect, the sensor is a contact sensor.

In another embodiment of the third aspect, the method is executed by a hub device.

In another embodiment of the third aspect, the method is executed by a backend device.

In another embodiment of the third aspect, the backend device is a server.

In another embodiment of the third aspect, further comprises: retrieving, from the A/V recording and communication device, at least one of the motion data and the image data.

In another embodiment of the third aspect, the alarm action includes at least one of sounding an alarm, contacting law enforcement, contacting a security monitoring service, and generating and transmitting a user alert to a client device associated with the security system.

In another embodiment of the third aspect, determining whether a person was present in the field of view of the A/V recording and communication device prior to the entry/exit event includes analyzing the image data using computer vision.

In another embodiment of the third aspect, the computer vision includes at least one of object recognition, object detection, facial recognition, and facial detection.

In another embodiment of the third aspect, the armed mode is an armed stay mode.

In another embodiment of the third aspect, the alarm action includes at least one of sounding an alarm, contacting law enforcement, contacting a security monitoring service, and generating and transmitting a user alert to a client device associated with the security system, and further wherein the alarm action occurs immediately upon the determination that a person was present in the field of view of the A/V recording and communication device prior to the entry/exit event activating an alarm action of the security system.

In another embodiment of the third aspect, the A/V recording and communication is one of a video doorbell, a security camera, a floodlight camera, and a spotlight camera.

In a fourth embodiment, a method is provided for a security system in an armed mode, the security system including a sensor installed at an entry point of a property and an audio/video (A/V) recording and communication device having a field of view encompassing the entry point and an area exterior to the property, the method comprising: receiving, from the sensor, sensor data indicative of one of an entry event and an exit event at the entry point; in response to receiving the sensor data, determining, based on at least one of motion data and image data generated by the A/V recording and communication device, that the sensor data indicates the entry event has occurred at the entry point; and activating an alarm action of the security system.

In an embodiment of the fourth aspect, the sensor is a contact sensor.

In another embodiment of the fourth aspect, the method is executed by a hub device.

In another embodiment of the fourth aspect, the method is executed by a backend device.

In another embodiment of the fourth aspect, the backend device is a server.

In another embodiment of the fourth aspect, the method further comprises: retrieving, from the A/V recording and communication device, at least one of the motion data and the image data.

In another embodiment of the fourth aspect, the alarm action includes at least one of sounding an alarm, contacting law enforcement, contacting a security monitoring service, and generating and transmitting a user alert to a client device associated with the security system.

In another embodiment of the fourth aspect, determining that the sensor data indicates the entry event has occurred includes analyzing at least one of the image data and the sensor data to determine that a person was present in a field of view of the camera prior to the entry event.

In another embodiment of the fourth aspect, the armed mode is an armed stay mode.

In another embodiment of the fourth aspect, the alarm action includes at least one of sounding an alarm, contacting law enforcement, contacting a security monitoring service, and generating and transmitting a user alert to a client device associated with the security system, and further wherein the alarm action occurs immediately upon the determination that the sensor data indicates the entry event has occurred at the entry point.

In another embodiment of the fourth aspect, the A/V recording and communication is one of a video doorbell, a security camera, a floodlight camera, and a spotlight camera.

In a fifth aspect, a network device communicatively coupled to a security system in an armed mode, comprises: one or more processors; a communication module; and a non-transitory machine-readable memory storing a program, the program executable by at least one of the processors, the program comprising sets of instructions for: receiving, using the communication module, from a sensor of the security system, sensor data indicative of an entry/exit event at an entry point of a property where the security system is installed; in response to receiving the sensor data, determining, based on at least one of motion data and image data generated by an A/V recording and communication device having a field of view encompassing the entry point and an area exterior to the property, whether a person was present in the field of view of the A/V recording and communication device prior to the entry/exit event; in response to the determination that a person was present in the field of view of the A/V recording and communication device prior to the entry/exit event, determining, based on the image data, whether the person is authorized; and upon determining that the person is not authorized, activating an alarm action of the security system.

In an embodiment of the fifth aspect, the sensor is a contact sensor.

In another embodiment of the fifth aspect, the network device is a hub device of the security system.

In another embodiment of the fifth aspect, the network device is a backend device.

In another embodiment of the fifth aspect, the backend device is a server.

In another embodiment of the fifth aspect, the program further includes sets of instructions for: retrieving, using the communication module, from the A/V recording and communication device, at least one of the motion data and the image data.

In another embodiment of the fifth aspect, wherein the program further includes sets of instructions for: receiving, using the communication module, from the A/V recording and communication device, at least one of the motion data and the image data.

In another embodiment of the fifth aspect, the alarm action includes at least one of sounding an alarm, contacting law enforcement, contacting a security monitoring service, and generating and transmitting a user alert to a client device associated with the security system.

In another embodiment of the fifth aspect, determining whether a person was present in the field of view of the A/V recording and communication device prior to the entry/exit event includes analyzing the image data using computer vision.

In another embodiment of the fifth aspect, the computer vision includes at least one of object recognition, object detection, facial recognition, and facial detection.

In another embodiment of the fifth aspect, the armed mode is an armed stay mode.

In another embodiment of the fifth aspect, the alarm action includes at least one of sounding an alarm, contacting law enforcement, contacting a security monitoring service, and generating and transmitting a user alert to a client device associated with the security system, and further wherein the alarm action occurs immediately upon the determination that the person is not authorized.

In another embodiment of the fifth aspect, the A/V recording and communication is one of a video doorbell, a security camera, a floodlight camera, and a spotlight camera.

In a sixth embodiment, a method is provided for a security system in an armed mode, the security system including a sensor installed at a doorway of a property and an audio/video (A/V) recording and communication device having a field of view exterior to the property and including at least the area in proximity to the doorway, the method comprising: receiving, from the sensor, sensor data indicative of an entry/exit event at the doorway; in response to receiving the sensor data, determining, based on at least one of motion data and image data generated by the A/V recording and communication device, whether a person was present in the field of view of the A/V recording and communication device prior to the entry/exit event; in response to the determination that a person was present in the field of view of the A/V recording and communication device prior to the entry/exit event, determining, based on the image data, whether the person is authorized; and upon determining that the person is not authorized, activating an alarm action of the security system.

In an embodiment of the sixth aspect, the sensor is a contact sensor.

In another embodiment of the sixth aspect, the method is executed by a hub device.

In another embodiment of the sixth aspect, the method is executed by a backend device.

In another embodiment of the sixth aspect, the backend device is a server.

In another embodiment of the sixth aspect, the method further comprises: retrieving, from the A/V recording and communication device, at least one of the motion data and the image data. In another embodiment of the sixth aspect, the alarm action includes at least one of sounding an alarm, contacting law enforcement, contacting a security monitoring service, and generating and transmitting a user alert to a client device associated with the security system.

In another embodiment of the sixth aspect, determining whether a person was present in the field of view of the A/V recording and communication device prior to the entry/exit event includes analyzing the image data using computer vision.

In another embodiment of the sixth aspect, the computer vision includes at least one of object recognition, object detection, facial recognition, and facial detection.

In another embodiment of the sixth aspect, the armed mode is an armed stay mode.

In another embodiment of the sixth aspect, the alarm action includes at least one of sounding an alarm, contacting law enforcement, contacting a security monitoring service, and generating and transmitting a user alert to a client device associated with the security system, and further wherein the alarm action occurs immediately upon the determination that the person is not authorized.

In a seventh aspect, a network device communicatively coupled to a security system in an armed mode, comprises: one or more processors; a communication module; and a non-transitory machine-readable memory storing a program, the program executable by at least one of the processors, the program comprising sets of instructions for: receiving, using the communication module, from a sensor of the security system, sensor data indicative of an entry/exit event at an entry point of a property where the security system is located; in response to receiving the sensor data, determining, based on at least one of motion data and image data generated by an A/V recording and communication device installed at the property and having a field of view including an area exterior to the property and in the proximity of the entry point, whether a person was present in the field of view of the A/V recording and communication within a first predetermined amount of time before the entry/exit event; upon determining that a person was not present in the field of view of the A/V recording and communication device within the first predetermined amount of time before the entry/exit event, initiating an alarm delay; in response to initiating the alarm delay, determining based on at least one of the motion data and the image data, if a person is in the field of view of the A/V recording and communication device within a second predetermined amount of time after the entry/exit event; upon determining that a person is not within the field of view of the A/V recording and communication device within the second predetermined amount of time, activating an alarm action of the security system; and upon determining that a person is within the field of view of the A/V recording and communication device within the second predetermined amount of time: when a disarming action is received prior to the completion of the alarm delay, disarming the security system; and when the disarming action is not received prior to the completion of the alarm delay, activating the alarm action of the security system.

In an embodiment of the seventh aspect, the sensor is a contact sensor.

In another embodiment of the seventh aspect, the network device a hub device of the security system.

In another embodiment of the seventh aspect, the network device is a backend device.

In another embodiment of the seventh aspect, the backend device is a server.

In another embodiment of the seventh aspect, the program further comprises sets of instructions for: retrieving, using the communication module, from the A/V recording and communication device, at least one of the motion data and the image data.

In another embodiment of the seventh aspect, the program further comprises sets of instructions for: receiving, using the communication module, from the A/V recording and communication device, at least one of the motion data and the image data.

In another embodiment of the seventh aspect, the alarm action includes at least one of sounding an alarm, contacting law enforcement, contacting a security monitoring service, and generating and transmitting a user alert to a client device associated with the security system.

In another embodiment of the seventh aspect, determining whether a person was present in the field of view of the A/V recording and communication device prior to the entry/exit event and after the entry/exit event includes analyzing the image data using computer vision.

In another embodiment of the seventh aspect, the computer vision includes at least one of object recognition, object detection, facial recognition, and facial detection.

In another embodiment of the seventh aspect, the first predetermined amount of time is within five seconds of the entry/exit event.

In another embodiment of the seventh aspect, the first predetermined amount of time is within three seconds of the entry/exit event.

In another embodiment of the seventh aspect, the second predetermined amount of time is within five seconds of the entry/exit event.

In another embodiment of the seventh aspect, the second predetermined amount of time is within three seconds of the entry/exit event.

In another embodiment of the seventh aspect, the armed mode is an armed stay mode.

In another embodiment of the seventh aspect, the A/V recording and communication is one of a video doorbell, a security camera, a floodlight camera, and a spotlight camera.

In an eighth aspect, a network device communicatively coupled to a security system in an armed mode is provided, the network device comprising: one or more processors; a communication module; and a non-transitory machine-readable memory storing a program, the program executable by at least one of the processors, the program comprising sets of instructions for: receiving, using the communication module, from a sensor of the security system, sensor data indicative of an entry/exit event at an entry point of a property where the security system is installed; in response to receiving the sensor data, determining, based on at least one of motion data and image data generated by an A/V recording and communication device having a field of view encompassing the entry point and an area exterior to the property, whether a person was present in the field of view of the A/V recording and communication device prior to the entry/exit event; in response to the determination that a person was present in the field of view of the A/V recording and communication device prior to the entry/exit event, determining, based on the image data, whether the person is authorized; and upon determining that the person is not authorized, activating an alarm action of the security system.

In an embodiment of the eighth aspect, the sensor is a contact sensor.

In another embodiment of the eighth aspect, the network device is a hub device of the security system.

In another embodiment of the eighth aspect, the network device is a backend server.

In another embodiment of the eighth aspect, the alarm action includes at least one of sounding an alarm, contacting law enforcement, contacting a security monitoring service, and generating and transmitting a user alert to a client device associated with the security system.

In another embodiment of the eighth aspect, wherein determining whether a person was present in the field of view of the A/V recording and communication device prior to the entry/exit event includes analyzing the image data using computer vision.

In another embodiment of the eighth aspect, the computer vision includes at least one of object recognition, object detection, facial recognition, and facial detection.

In another embodiment of the eighth aspect, the alarm action includes at least one of sounding an alarm, contacting law enforcement, contacting a security monitoring service, and generating and transmitting a user alert to a client device associated with the security system, and further wherein the alarm action occurs after the determination that the person is not authorized.

In another embodiment of the eighth aspect, wherein determining, based on the image data, whether the person is authorized includes using biometrics authentication.

In another embodiment of the eighth aspect, the biometrics authentication includes analyzing the image data using computer vision to identify at least one facial feature of the person in the image data.

In another embodiment of the eighth aspect, the biometrics authentication further includes comparing the at least one facial feature of the person identified in the image data against a database of authorized persons.

In another embodiment of the eighth aspect, the biometrics authentication further includes identifying a biometric identifier, wherein the biometric identifier includes at least one of fingerprint, voice, iris feature, and retina feature.

In a ninth aspect, method for a security system in an armed mode is provided, the security system including a sensor installed at a doorway of a property and an audio/video (A/V) recording and communication device having a field of view exterior to the property and including at least the area in proximity to the doorway, the method comprising: receiving, from the sensor, sensor data indicative of an entry/exit event at the doorway; in response to receiving the sensor data, determining, based on at least one of motion data and image data generated by the A/V recording and communication device, whether a person was present in the field of view of the A/V recording and communication device prior to the entry/exit event; in response to the determination that a person was present in the field of view of the A/V recording and communication device prior to the entry/exit event, determining, based on the image data, whether the person is authorized; and upon determining that the person is not authorized, activating an alarm action of the security system.

In an embodiment of the ninth aspect, the sensor is a contact sensor.

In another embodiment of the ninth aspect, the method is executed by a hub device.

In another embodiment of the ninth aspect, the method is executed by a backend server.

In another embodiment of the ninth aspect, the alarm action includes at least one of sounding an alarm, contacting law enforcement, contacting a security monitoring service, and generating and transmitting a user alert to a client device associated with the security system.

In another embodiment of the ninth aspect, wherein determining whether a person was present in the field of view of the A/V recording and communication device prior to the entry/exit event includes analyzing the image data using computer vision.

In another embodiment of the ninth aspect, the computer vision includes at least one of object recognition, object detection, facial recognition, and facial detection.

In another embodiment of the ninth aspect, the alarm action includes at least one of sounding an alarm, contacting law enforcement, contacting a security monitoring service, and generating and transmitting a user alert to a client device associated with the security system, and further wherein the alarm action occurs after the determination that the person is not authorized.

In another embodiment of the ninth aspect, wherein determining, based on the image data, whether the person is authorized includes using biometrics authentication.

In another embodiment of the ninth aspect, the biometrics authentication includes analyzing the image data using computer vision to identify at least one facial feature of the person in the image data.

In another embodiment of the ninth aspect, the biometrics authentication further includes comparing the at least one facial feature of the person identified in the image data against a database of authorized persons.

In another embodiment of the ninth aspect, the biometrics authentication further includes identifying a biometric identifier, wherein the biometric identifier includes at least one of fingerprint, voice, iris feature, and retina feature.

BRIEF DESCRIPTION OF THE DRAWINGS

The various embodiments of the present activating security system alarms based on data generated by A/V recording and communication devices now will be discussed in detail with an emphasis on highlighting the advantageous features. These embodiments depict the novel and non-obvious activating security system alarms based on data generated by A/V recording and communication devices shown in the accompanying drawings, which are for illustrative purposes only. These drawings include the following figures, in which like numerals indicate like parts.

DETAILED DESCRIPTION

Figure 1:
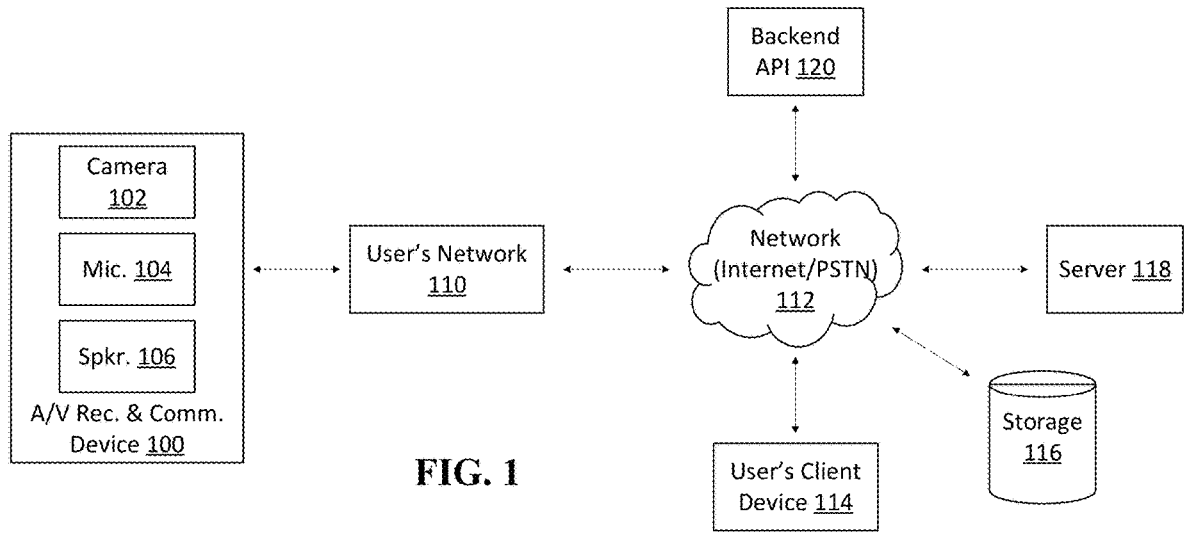
FIG. 1 is a functional block diagram illustrating one embodiment of a system including an A/V recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

With reference to FIG. 1, the present embodiments may include an audio/video (A/V) recording and communication device 100. The A/V recording and communication device 100 may in some embodiments comprise a doorbell, and may be located near the entrance to a structure (not shown), such as a dwelling, a business, a storage facility, etc. The A/V recording and communication device 100 may include a camera 102, a microphone 104, and a speaker 106. The camera 102 may comprise, for example, a high definition (HD) video camera, such as one capable of capturing video images at an image display resolution of 720 p, or 1080 p or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34 bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V recording and communication device 100 may also capture audio through the microphone 104. The A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
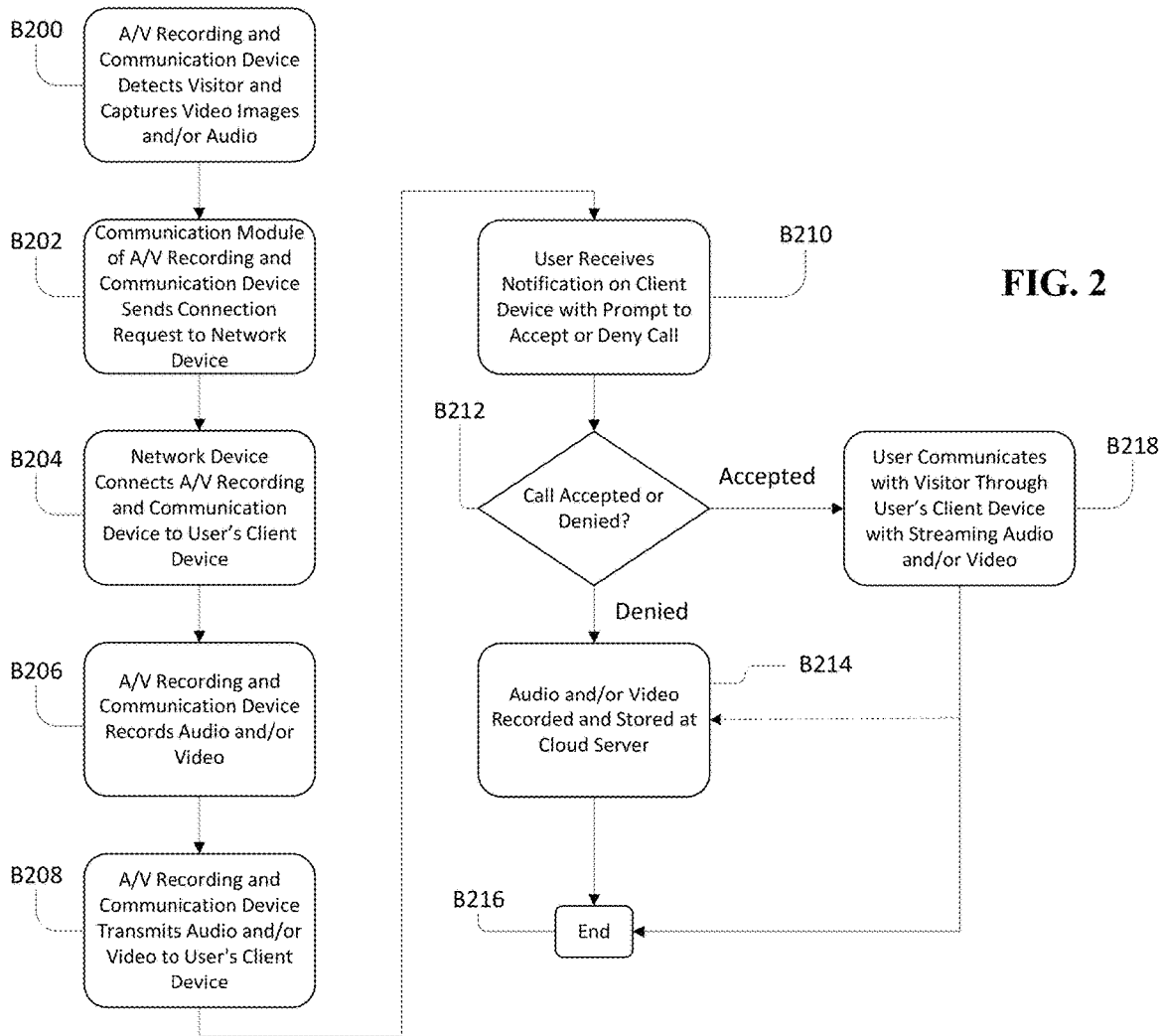
FIG. 2 is a flowchart illustrating one embodiment of a process for streaming and storing A/V content from an A/V recording and communication device according to various aspects of the present disclosure.

FIG. 2 is a flowchart illustrating a process for streaming and storing A/V content from an A/V recording and communication doorbell system according to various aspects of the present disclosure. At block B200, the A/V recording and communication device 100 detects the visitor's presence and begins capturing video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers.

The term server may be construed broadly to include any computerized process that shares a resource to one or more client processes.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
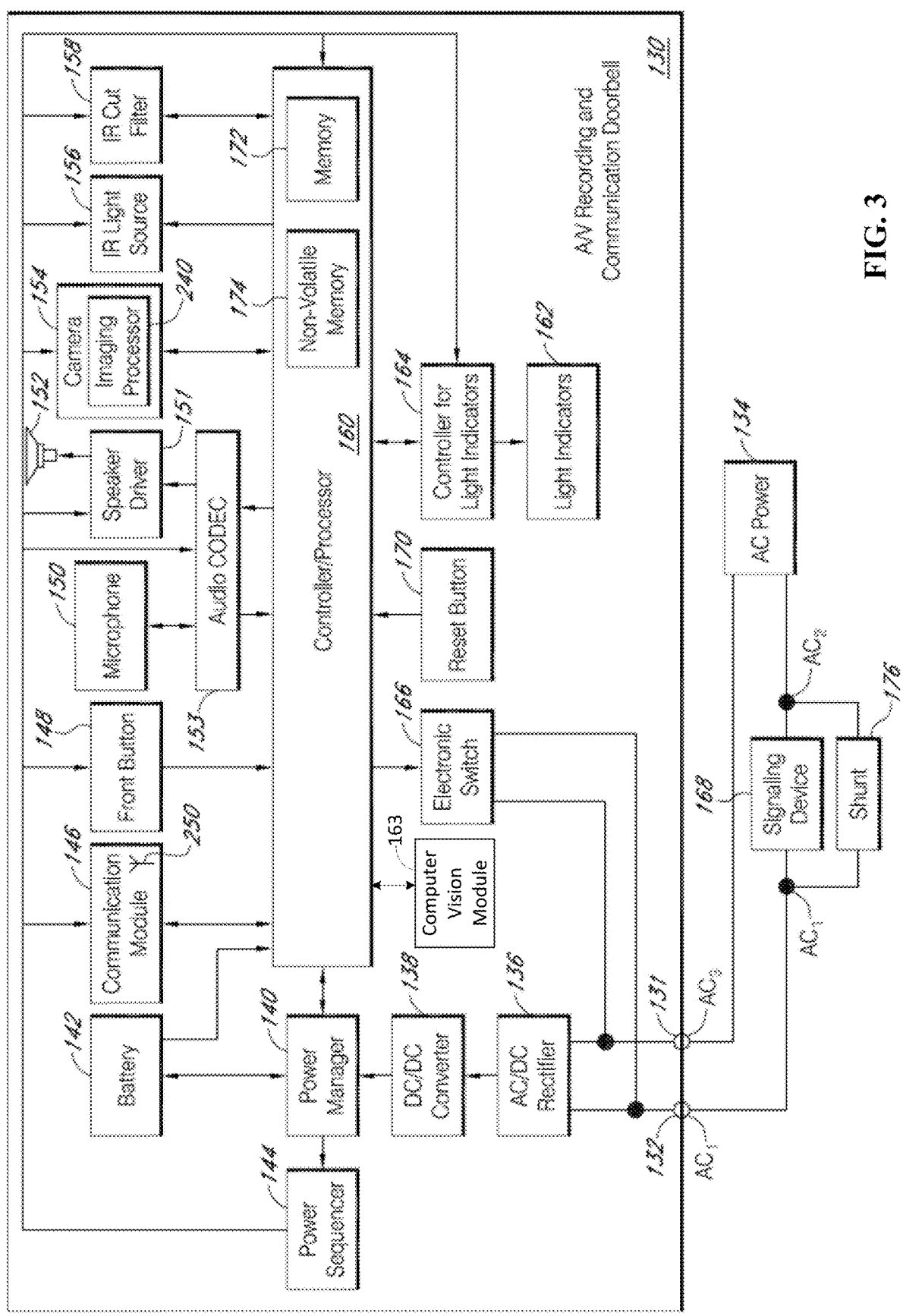
FIG. 3 is a functional block diagram illustrating an embodiment of an A/V recording and communication doorbell according to various aspects of the present disclosure.
Figure 4:
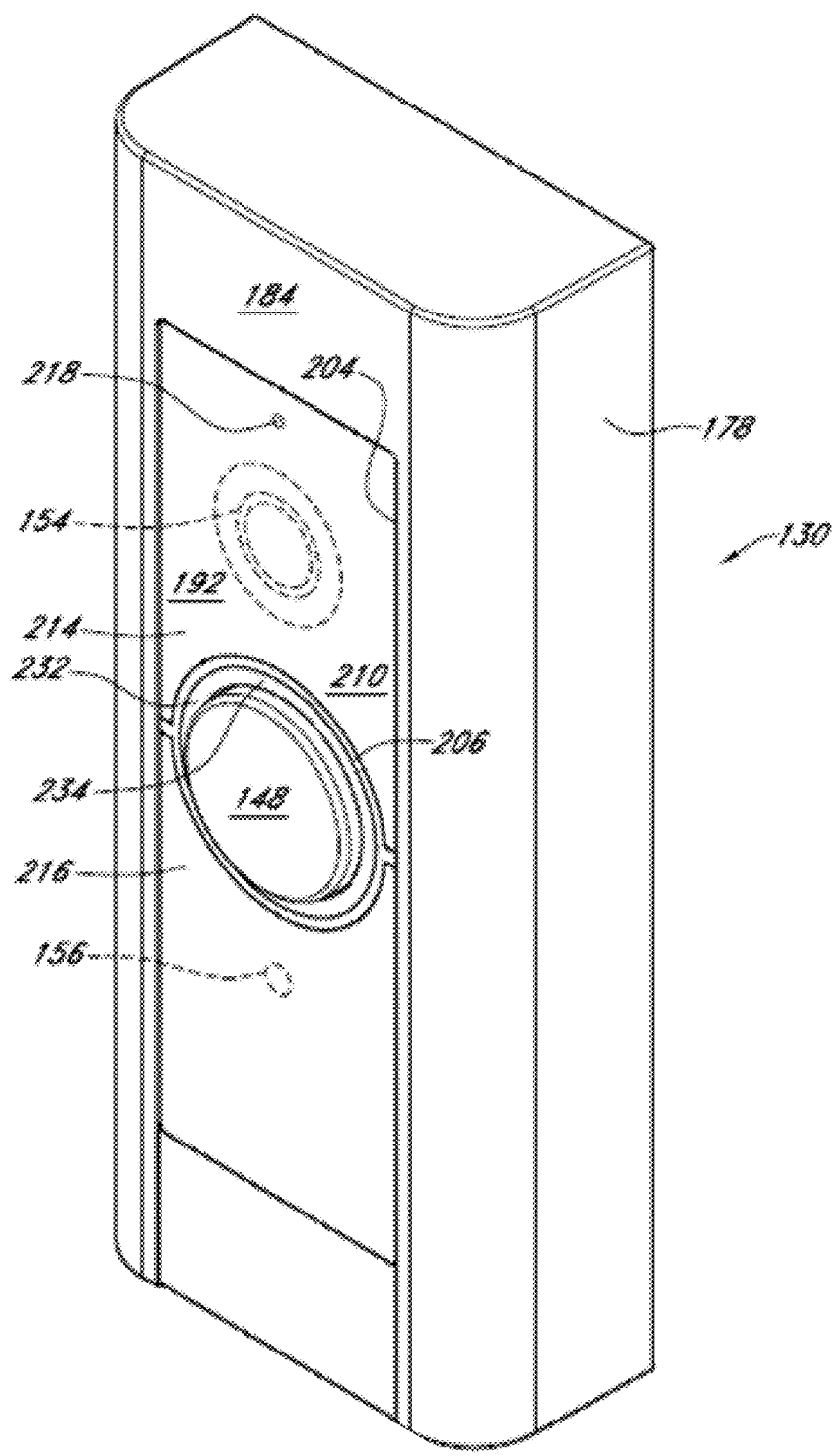
FIG. 4 is a front perspective view of an embodiment of an A/V recording and communication doorbell according to various aspects of the present disclosure.

FIGS. 3-4 illustrate one embodiment of a low-power-consumption A/V recording and communication doorbell 130 according to various aspects of the present disclosure. FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is depressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the doorbell 130 therefore causes the signaling device 168 to "ring," alerting any person(s) within the structure to which the doorbell 130 is mounted that there is a visitor at the front door (or at another location corresponding to the location of the doorbell 130). In one non-limiting example, the electronic switch 166 may be a triac device.

With reference to FIG. 4, the A/V recording and communication doorbell 130 further comprises a housing 178 having an enclosure (not shown), a back plate (not shown) secured to the rear of the enclosure, and a shell 184 overlying the enclosure. A front surface of the A/V recording and communication doorbell 130 may include the button 148 (may also be referred to as front button 148), which is operatively connected to a processor (not shown). In a process similar to that described above with reference to FIG. 2, when a visitor presses the front button 148, an alert may be sent to the user's client device to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With further reference to FIG. 4, the shell 184 includes a central opening 204 in a front surface. The central opening 204 is sized and shaped to accommodate the shield 192. The shield 192 includes an upper portion 214 (located above and to the sides of the front button 148) and a lower portion 216 (located below and to the sides of the front button 148). The upper portion 214 of the shield 192 may be transparent or translucent so that it does not interfere with the field of view of the camera 154. As described in detail below, a microphone, which is operatively connected to the processor, is located behind the upper portion 214 of the shield 192. The upper portion 214, therefore, may include an opening 218 that facilitates the passage of sound through the shield 192 so that the microphone is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. The lower portion 216 of the shield 192, therefore, does not interfere with transmission of IR light from the IR light source, which is located behind the lower portion 216. As described in detail below, the IR light source and the IR cut filter, which are both operatively connected to the processor, facilitate "night vision" functionality of the camera 154.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs and/or other motion detectors, heat source detectors, etc. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact, although in some alternative embodiments the doorbell may include a separate light detector.

Figure 5:
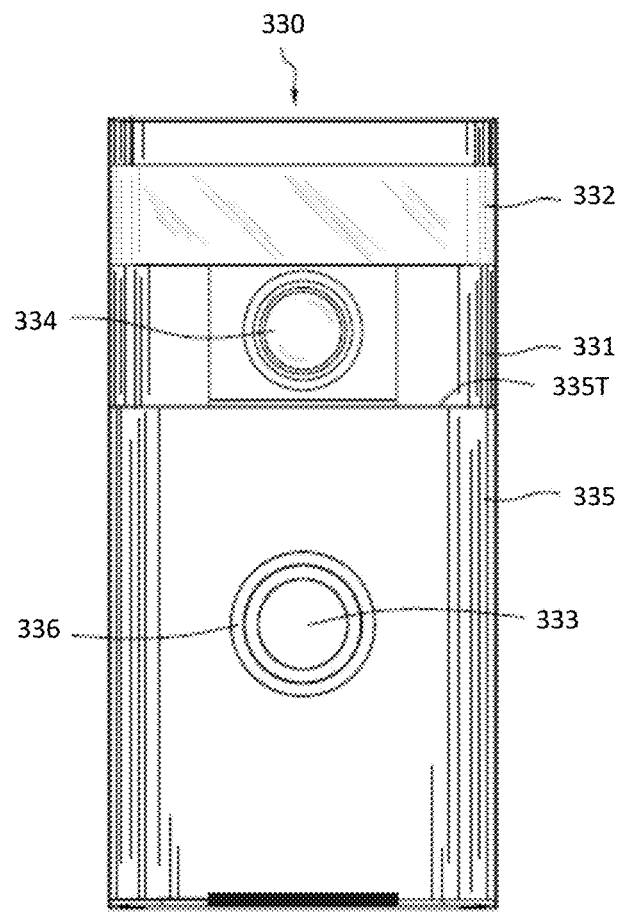
FIG. 5 is a front view of another embodiment of an A/V recording and communication doorbell according to various aspects of the present disclosure.
Figure 6:
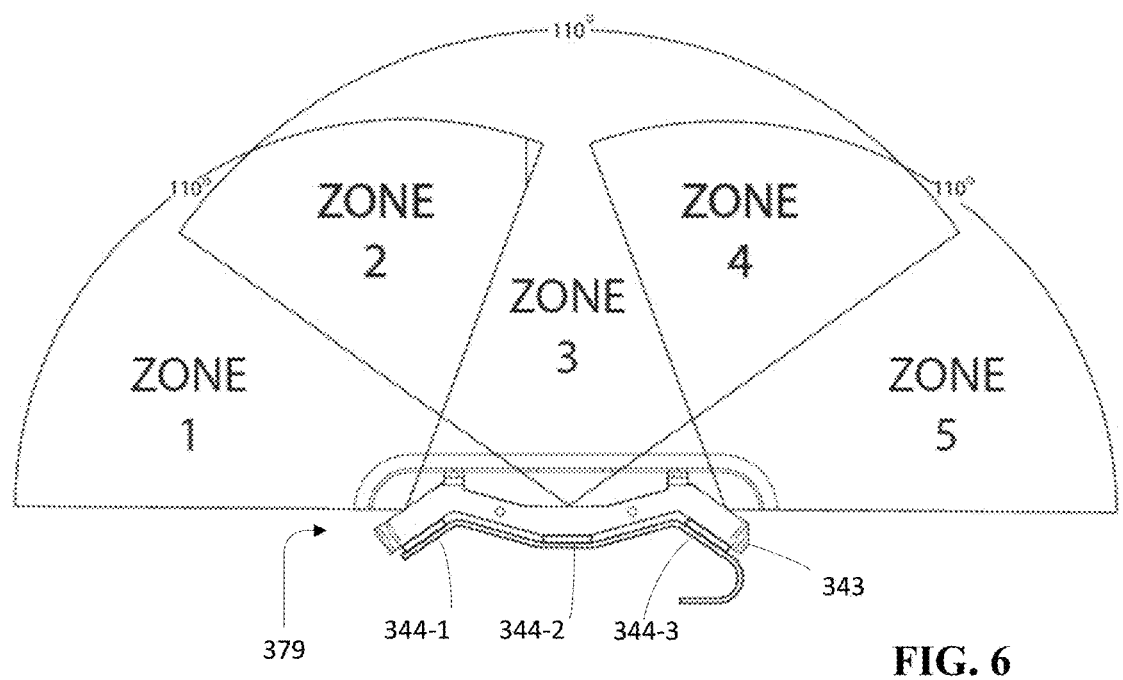
FIG. 6 is a top view of a passive infrared sensor assembly of the A/V recording and communication doorbell of FIG. 5, illustrating fields of view of passive infrared sensors of the passive infrared sensor assembly according to various aspects of the present disclosure.
Figure 7:
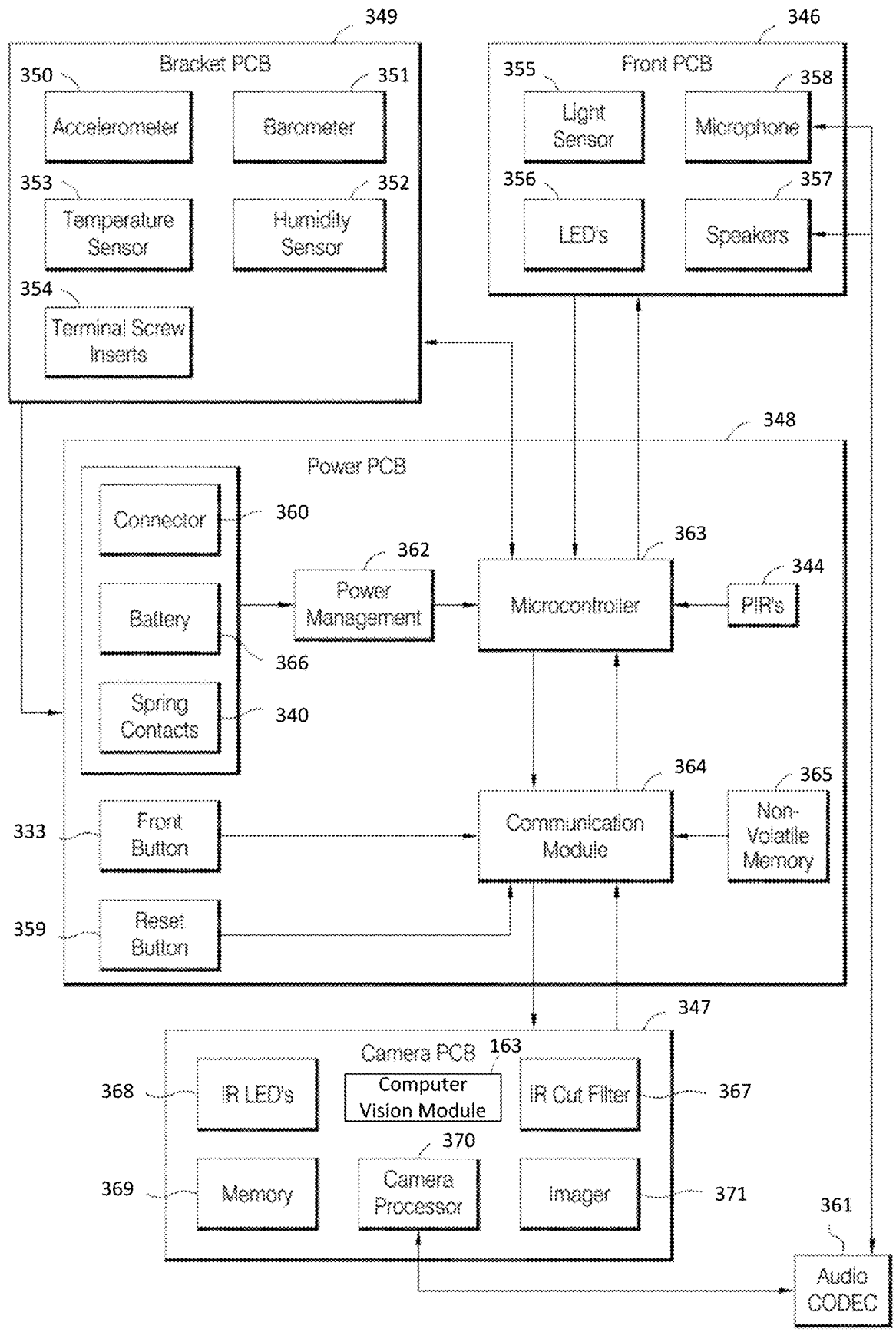
FIG. 7 is a functional block diagram of the components of the A/V recording and communication doorbell of FIG. 5.

FIGS. 5-7 illustrate another embodiment of a wireless audio/video (A/V) communication doorbell 330 according to an aspect of present embodiments. FIG. 5 is a front view of the wireless A/V communication doorbell 330. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate (not shown). The faceplate 335 protects the internal contents of the doorbell 330 and serves as an exterior front surface of the doorbell 330. The faceplate 335 may include a button 333 and a light pipe 336. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With further reference to FIG. 5, the doorbell 330 further includes an enclosure 331 that engages the faceplate 335. The doorbell 330 further includes a lens 332. In some embodiments, the lens may comprise a Fresnel lens, which may be patterned to deflect incoming light into one or more infrared sensors located within the doorbell 330. The doorbell 330 further includes a camera 334, which captures video data when activated, as described below.

The doorbell 330 further comprises passive infrared (PIR) sensors 344-1, 344-2, 344-3 (FIG. 6, hereinafter collectively referred to as the PIR sensors 344), which are secured on or within a PIR sensor holder 343 (FIG. 6), and the assembly resides behind the lens 332. In some embodiments, the doorbell 330 may comprise three PIR sensors 344-1, 344-2, 344-3, as further described below, but in other embodiments any number of PIR sensors 344 may be provided. In some embodiments, one or more of the PIR sensors 344 may comprise a pyroelectric infrared sensor. The PIR sensors 344 may be any type of sensor capable of detecting and communicating the presence of a heat source within their field of view. Further, alternative embodiments may comprise one or more motion sensors either in place of or in addition to the PIR sensors 344.

FIG. 6 is a top view of the passive infrared sensor assembly 379 illustrating the fields of view of the passive infrared sensors 344. In the illustrated embodiment, the side faces of the passive infrared sensor holder 343 are angled at 55° facing outward from the center face, and each PIR sensor 344 has a field of view of 110°. However, these angles may be increased or decreased as desired. Zone 1 is the area that is visible only to a first one of the passive infrared sensors 344-1. Zone 2 is the area that is visible only to the first one of the PIR sensor 344-1 and a second one of the PIR sensors 344-2. Zone 3 is the area that is visible only to a second one of the PIR sensors 344-2. Zone 4 is the area that is visible only to the second one of the PIR sensors 344-2 and a third one of the passive infrared sensors 344-3. Zone 5 is the area that is visible only to the third one of the PIR sensors 344-3. In some embodiments, the doorbell 130 may be capable of determining the direction that an object is moving based upon which zones are triggered in a time sequence.

FIG. 7 is a functional block diagram of the components within or in communication with the doorbell 330, according to an aspect of the present embodiments. The bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. The bracket PCB 349 may be located outside the housing of the doorbell 330 so as to reduce interference from heat, pressure, moisture, and/or other stimuli generated by the internal components of the doorbell 330.

With further reference to FIG. 7, the bracket PCB 349 may further comprise terminal screw inserts 354, which may be configured to receive the terminal screws and transmit power to the electrical contacts on the mounting bracket. The bracket PCB 349 may be electrically and/or mechanically coupled to the power PCB 348 through the terminal screws, the terminal screw inserts 354, the spring contacts 340, and the electrical contacts. The terminal screws may receive electrical wires located at the surface to which the doorbell 330 is mounted, such as the wall of a building, so that the doorbell can receive electrical power from the building's electrical system. Upon the terminal screws being secured within the terminal screw inserts 354, power may be transferred to the bracket PCB 349, and to all of the components associated therewith, including the electrical contacts. The electrical contacts may transfer electrical power to the power PCB 348 by mating with the spring contacts 340.

With further reference to FIG. 7, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electro-mechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 5). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114 (FIG. 1). When the user speaks, after being transferred through the network 112, digital audio data is decompressed by audio CODEC 361 and emitted to the visitor via the speakers 357.

With further reference to FIG. 7, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 7, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 7, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 7, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080 p or better) video files. A camera processor 370 may comprise an encoding and compression chip. In some embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random-access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, with reference to FIG. 3, embodiments of the present A/V recording and communication doorbell 130 may include a computer vision module 163. The computer vision module 163 may include any of the components (e.g., hardware) and/or functionality described herein with respect to computer vision, including, without limitation, one or more cameras, sensors, and/or processors. In some of the present embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 163, and/or the camera 154 and/or the processor 160 may receive information about the person using any one, or any combination of more than one, of the foregoing biometrics.

As described above, one aspect of the present embodiments includes the realization that many security systems, other than the present embodiments, activate the alarm when a door/window is opened from the inside or the outside during an armed stay mode (e.g., when the alarm is armed and the residents of the property are inside), because the security systems are not configured to make the determination of whether the door/window opening is indicative of an entry event (e.g., a person opening the door/window from outside of the property) or an exit event (e.g., a person opening the door/window from inside of the property). Because many security systems, other than the present embodiments, are not configured to make this determination, and because the user/owner may desire to sound the alarm when the door is opened from the outside (e.g., because it may be indicative of an intruder), the alarm is activated in response to any door/window opening event when the security system is in an armed stay mode. However, the user/owner of the security system may not desire to have the alarm activated in response to the door/window being opened from the inside, especially by one of the residents, because the resident may be performing a routine task (e.g., taking out the trash, walking the dog, getting the mail, opening the window for air flow, etc.) and may have forgotten to disarm the security system prior to opening the door/window.

The present embodiments solve this problem by leveraging the functionality of A/V recording and communication devices (e.g., video doorbells, security cameras, floodlight cameras, etc.) having fields of view of the area exterior to and about the door/window to make a determination of whether a person was present in the field of view of the A/V recording and communication device prior to the entry event or the exit event. For example, if a person was not present in the field of view of the A/V recording and communication device prior to the entry event or the exit event, then the event is likely an exit event (e.g., a person opening the door from the inside), and the security system may be configured to react differently to an exit event than to an entry event. In one example, the security system may activate an alarm delay (similar to the alarm delay in an armed away mode) for an exit event to allow the resident time to disarm the security system, but may automatically and/or immediately sound the alarm for an entry event (e.g., where it is determined that a person was present in the field of view of the A/V recording and communication device prior to the exit or entry event). As a result, the user/owner of the security system may be more likely to activate the security system, especially to an armed stay mode, knowing that an exit event will not automatically trigger an alarm action. Because the user/owner may be more likely to activate the alarm, the safety and security of the property and the residents/occupants of the property is increased, contributing to public safety as a whole.

For example, in some of the present embodiments, a security system may be in an armed mode, the security system may include a sensor installed at an entry point of a property and an audio/video (A/V) recording and communication device having a field of view including an area exterior to the property and in the proximity of the entry point, and the security system may be configured to receive, from the sensor, sensor data indicative of an entry/exit event at the entry point; in response to receiving the sensor data, determine, based on at least one of motion data and image data generated by the A/V recording and communication device, whether a person was present in the field of view of the A/V recording and communication device prior to the entry/exit event; based on the determination that a person was not present in the field of view of the A/V recording and communication device prior to the entry/exit event, initiate an alarm delay; when a disarming action is received prior to the completion of the alarm delay, disarm the security system; and when the disarming action is not received prior to the completion of the alarm delay, activate an alarm action of the security system.

Figure 8:
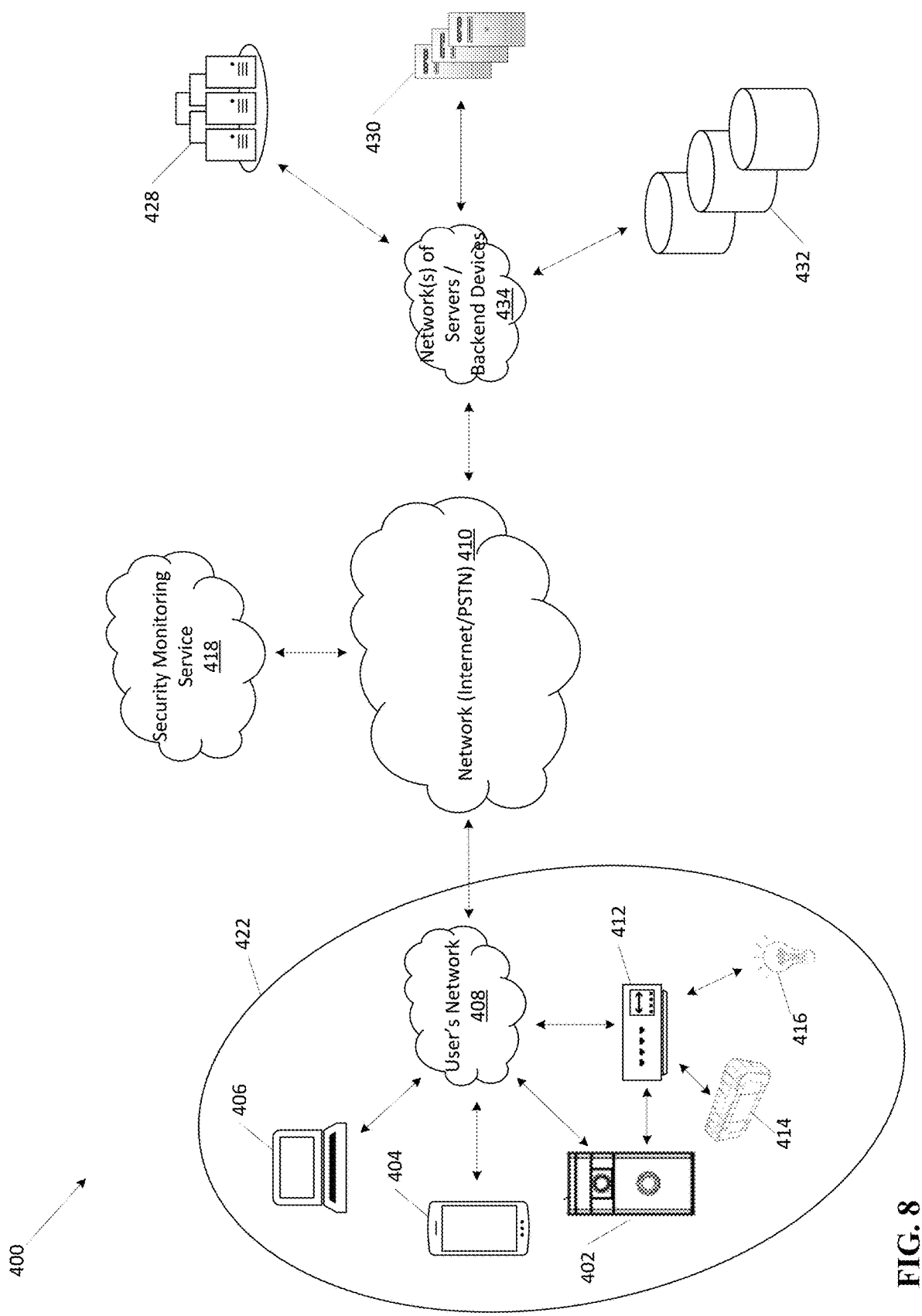
FIG. 8 is a functional block diagram illustrating a system for communicating in a network according to various aspects of the present disclosure.

FIG. 8 is a functional block diagram illustrating a system 400 for communicating in a network according to various aspects of the present disclosure. The system 400 may include one or more A/V recording and communication devices 402 configured to access a user's network 408 to connect to a network (Internet/PSTN) 410 (in some embodiments, the devices 402 may be configured to connect directly to the network (Internet/PSTN) 410, such as over a cellular connection). The one or more A/V recording and communication devices 402 may include any or all of the components and/or functionality of the A/V recording and communication device 100 (FIGS. 1-2), the A/V recording and communication doorbell 130 (FIGS. 3-4), and/or the A/V recording and communication doorbell 330 (FIGS. 5-7). In some of the present embodiments, the A/V recording and communication device 402 may not be a doorbell. For example, the A/V recording and communication device 402 may be a security camera, a floodlight camera, a spotlight camera, or the like. An example A/V recording and communication security camera may include substantially all of the structure and functionality of the doorbell 130, but without the front button 148, the button actuator 228, and/or the light pipe 232.

The user's network 408 may include any or all of the components and/or functionality of the user's network 110 described herein. The system 400 may also include one or more client devices 404, 406, which in various embodiments may be configured to be in network communication and/or associated with the A/V recording and communication device 402. The client devices 404, 406 may comprise, for example, a mobile phone such as a smartphone, or a computing device such as a tablet computer, a laptop computer, a desktop computer, etc. The client devices 404, 406 may include any or all of the components and/or functionality of the client device 114 (FIG. 1) and/or the client device 800 (FIG. 18) described herein. In some embodiments, one or more of the client devices 404, 406 may not be associated with the A/V recording and communication device 402.

The system 400 may further include a smart-home hub device 412 (which may alternatively be referred to herein as the hub device 412) connected to the user's network 408. The smart-home hub device 412 (also known as a home automation hub, gateway device, etc.), may comprise any device that facilitates communication with and control of the sensors 414, automation devices 416, the one or more A/V recording and communication devices 402, and/or other A/V recording and communication devices (not shown, e.g., security cameras, floodlight cameras, spotlight cameras, etc.). For example, the smart-home hub device 412 may be a component of a home automation system installed at a property. As illustrated in FIG. 8, the A/V recording and communication device 402 may communicate with the smart-home hub device 412 directly and/or indirectly via the user's network 408 and/or the network (Internet/PSTN) 410. As also illustrated in FIG. 8, the sensors 414 and the automation devices 416 may communicate with the smart-home hub device 412 directly and/or indirectly via the user's network 408.

Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. Smart home devices (e.g., the hub device 412, the sensors 414, the automation devices 416, the A/V recording and communication devices 402, etc.), when remotely monitored and controlled via the network (Internet/PSTN) 410, may be considered to be components of the Internet of Things. Smart home systems may include switches and/or sensors (e.g., the sensors 414) connected to a central hub such as the smart-home hub device 412, sometimes called a gateway, from which the system may be controlled with a user interface. The user interface may include any or all of a wall-mounted terminal, software installed on the client devices 404, 406 (e.g., a mobile application), a tablet computer or a web interface, often but not always via Internet cloud services. The home automation system may use one or more communication protocols, including either or both of wired and wireless protocols, including but not limited to Wi-Fi, X10, Ethernet, RS-485, 6LoWPAN, Bluetooth LE (BTLE), ZigBee, and Z-Wave.

The one or more sensors 414 may include, for example, at least one of a door sensor, a window sensor, a contact sensor, a tilt sensor, a temperature sensor, a carbon monoxide sensor, a smoke detector, a light sensor, a glass break sensor, a motion sensor, a thermostat, and/or other sensors that may provide the user/owner of the security system 422 a notification of a security event at his or her property.

The one or more automation devices 416 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.) and/or other automation devices.

As described herein, in some of the present embodiments, some or all of the user's network 408, the client devices 404, 406, the A/V recording and communication device 402, the smart-home hub device 412, the sensors 414, and the automation devices 416 may be referred to as a security system 422, which may be installed at a property or premises.

With further reference to FIG. 8, the system 400 may also include various backend devices such as (but not limited to) storage devices 432, backend servers 430, and backend APIs 428 that may be in network communication with the A/V recording and communication device 402, the hub device 412, the client devices 404, 406, the sensors 414, and/or the automation devices 416. In some embodiments, the storage devices 432 may be a separate device from the backend servers 430 (as illustrated) or may be an integral component of the backend servers 430. The storage devices 432 may be similar in structure and/or function to the storage device 116 (FIG. 1). In addition, in some embodiments, the backend servers 430 and backend APIs 428 may be similar in structure and/or function to the server 118 and the backend API 120 (FIG. 1), respectively.

With further reference to FIG. 8, the system 400 may also include a security monitoring service 418. The security monitoring service 418 may be operated by the same company that manufactures, sells, and/or distributes the A/V recording and communication device 402, the hub device 412, the sensors 414, and/or the automation devices 416. In other embodiments, the security monitoring service 418 may be operated by a third-party company (e.g., a different company than the one that manufactured, sold, and/or distributed the A/V recording and communication device 402, the hub device 412, the sensors 414, and/or the automation devices 416). In any of the present embodiments, the security monitoring service 418 may have control of at least some of the features and components of the security system 422 (e.g., the security monitoring service 418 may be able to arm and/or disarm the security system 422, lock and/or unlock doors, activate and/or deactivate one or more of the sensors 414 and/or the automation devices 416, etc.).

Figure 9:
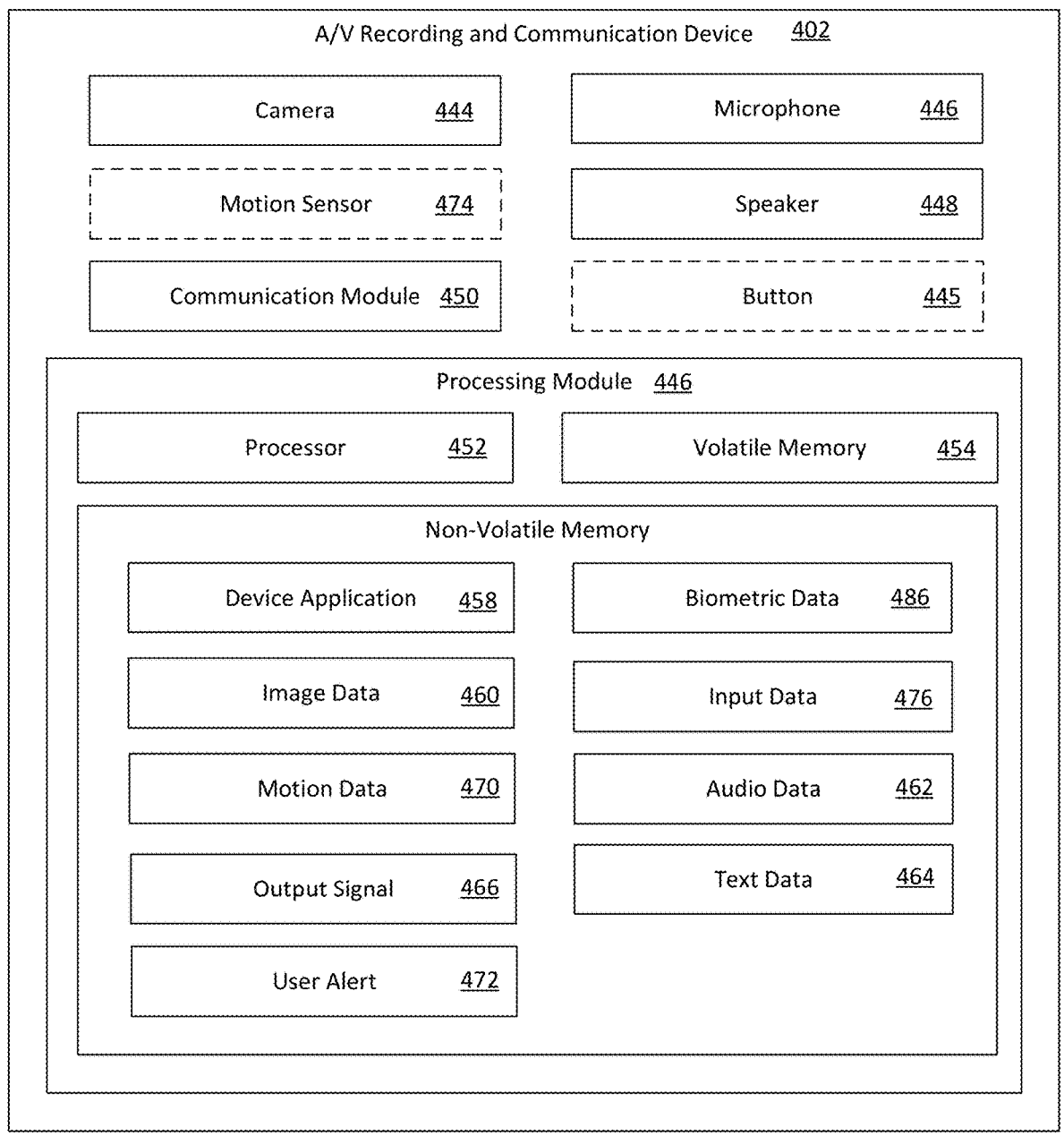
FIG. 9 is a functional block diagram illustrating one embodiment of an A/V recording and communication doorbell according to various aspects of the present disclosure.

FIG. 9 is a functional block diagram illustrating an embodiment of the A/V recording and communication device 402 according to various aspects of the present disclosure. The A/V recording and communication device 402 may comprise a processing module 446 that is operatively connected to a camera 444, a microphone 446, a speaker 448, a motion sensor 474, a button 445 (in embodiments where the A/V recording and communication device 402 is a doorbell), and a communication module 450. The processing module 446 may comprise a processor 452, volatile memory 454, and non-volatile memory 456 that includes a device application 458. In various embodiments, the device application 458 may configure the processor 452 to capture image data 460 using the camera 444, audio data 462 using the microphone 446, input data 476 using the button 445, and/or motion data 470 using the camera 444 and/or the motion sensor 474. In some embodiments, the device application 458 may also configure the processor 452 to generate text data 464 describing the image data 460, the audio data 462, and/or the input data 476, such as in the form of metadata, for example. In some of the present embodiments, the device application 458 may also configure the processor 452 to generate biometric data 486 (e.g., facial recognition using the camera 444 and/or other biometric data using one or more biometric devices (not shown)).

In addition, the device application 458 may configure the processor 452 to transmit the image data 460, the audio data 462, the motion data 470, the input data 476, the biometric data 486, the text data 464, and/or the user alert 472 to the hub device 412 and/or the backend server 430 using the communication module 450. In various embodiments, the device application 458 may also configure the processor 452 to generate and transmit an output signal 466 that may include the image data 460, the audio data 462, the text data 464, the input data 476, the biometric data 486, and/or the motion data 470. In some of the present embodiments, the output signal 466 may be transmitted to the backend server(s) 430 using the communication module 450, and the backend server(s) 430 may transmit (or forward) the output signal 466 to the client devices 404, 406 and/or the hub device 412. In other embodiments, the output signal 466 may be transmitted directly to the client devices 404, 406 and/or the hub device 412.

In further reference to FIG. 9, the image data 460 may comprise image sensor data such as (but not limited to) exposure values and data regarding pixel values for a particular sized grid. The image data 460 may include still images, live video, and/or pre-recorded images and/or video. The image data 460 may be recorded by the camera 444 in a field of view of the camera 444.

In further reference to FIG. 9, the motion data 470 may comprise motion sensor data generated in response to motion events. For example, in embodiments using a motion sensor 474, the motion data 470 may include an amount or level of a data type generated by the motion sensor 474. In some of the present embodiments, such as those where the A/V recording and communication device 402 is similar to that of the A/V recording and communication doorbell 130 of FIGS. 3-4, the motion data 470 may be generated by the camera 444. In such embodiments, the A/V recording and communication device 402 may not have a motion sensor 474 (as illustrated by the dashed lines around the motion sensor 474 in FIG. 9). In some of the present embodiments, the motion data 470 may be analyzed to determine the direction of movement of a person or object in the field of the A/V recording and communication device 402.

The input data 476 may include that data generated in response to an input to the button 445. The button 445 (which may include similar design and functionality to that of the front button 148 (FIG. 3) and/or the front button 333 (FIG. 7)), may receive an input (e.g., a press, a touch, a series of touches and/or presses, etc.) and may generate the input data 476 in response that is indicative of the type of input.

The biometric data 486 may be generated by the A/V recording and communication device 402 using biometric capabilities. For example, the biometric capabilities may include facial recognition and/or facial detection (as described above), fingerprint recognition, eye recognition (iris recognition, retinal scanning, etc.), voice recognition, and/or other biometric capabilities depending on the embodiment. The biometric capabilities may be used to determine the identity of persons who interact with and/or are in the field of view of the A/V recording and communication device 402. In other embodiments, the camera 444 may be used for iris recognition and/or facial recognition and the microphone 446 may be used for voice recognition. In such embodiments, the camera 444 and/or the microphone 446 may be referred to as a biometric device.

With further reference to FIG. 9, a user alert 472 may be generated by the processor 452 and transmitted, using the communication module 450, to the client devices 404, 406, the backend server 430, and/or the hub device 412. For example, in response to detecting motion using the camera 444 and/or the motion sensor 474, the A/V recording and communication device 402 may generate and transmit the user alert 472. In some of the present embodiments, the user alert 472 may include at least the image data 470 and/or the motion data 460, and the backend server 430 and/or the hub device 412 may analyze the image data 460 and/or the motion data 470 to determine if a person was/is present in the field of view of the camera 444 and/or the field of view of the motion sensor 474 prior to and/or after an entry/exit event is detected by one or more sensors 414 of the security system 422. As described herein, the determination of whether a person is/was present may be used by the hub device 412 and/or the backend server 430 to determine whether or not to activate one or more alarm action 494 and/or initiate an alarm delay 482 (FIGS. 10-11).

Figure 10:
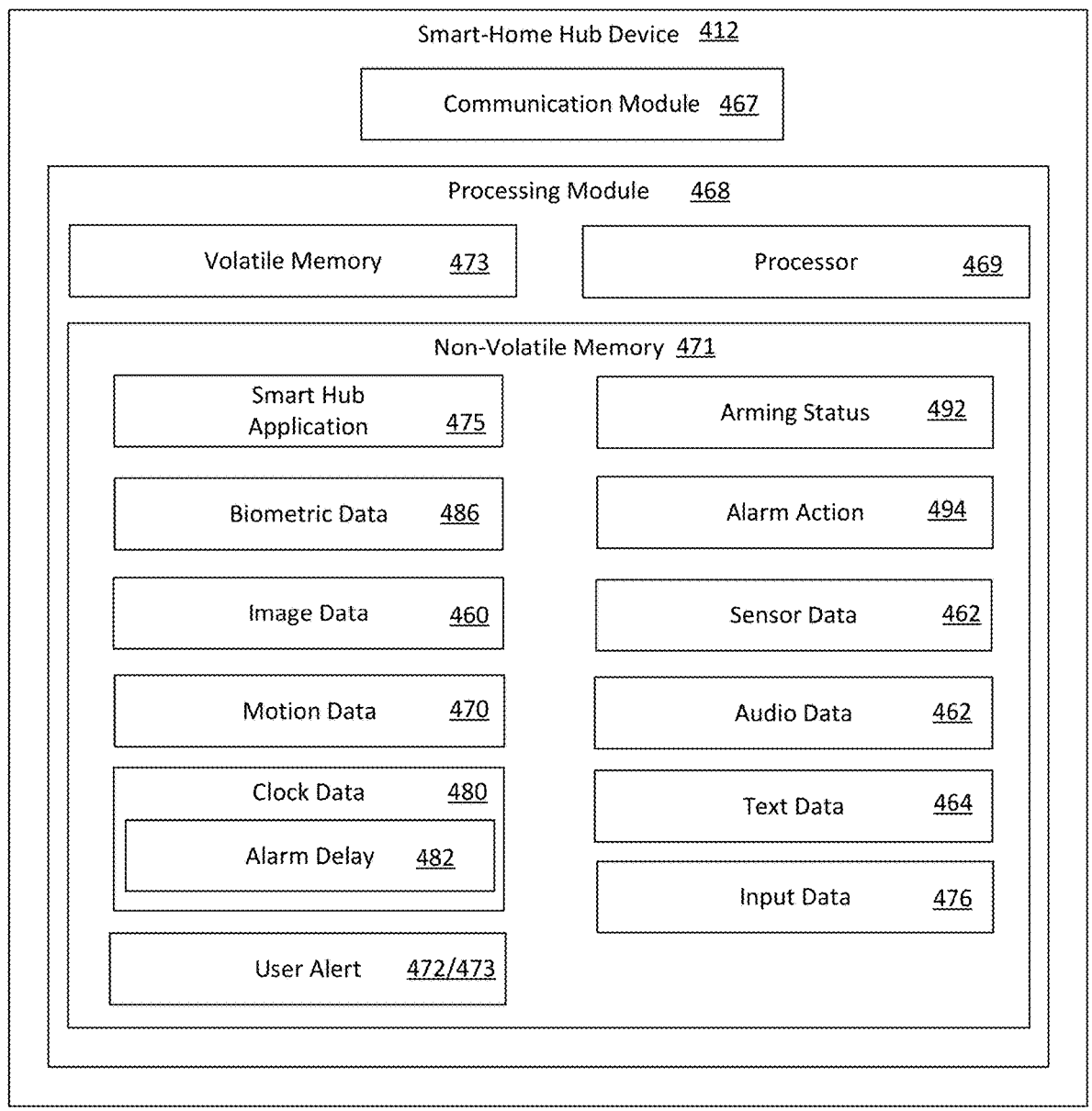
FIG. 10 is a functional block diagram illustrating one embodiment of a smart-home hub device according to various aspects of the present disclosure.
Figure 11:
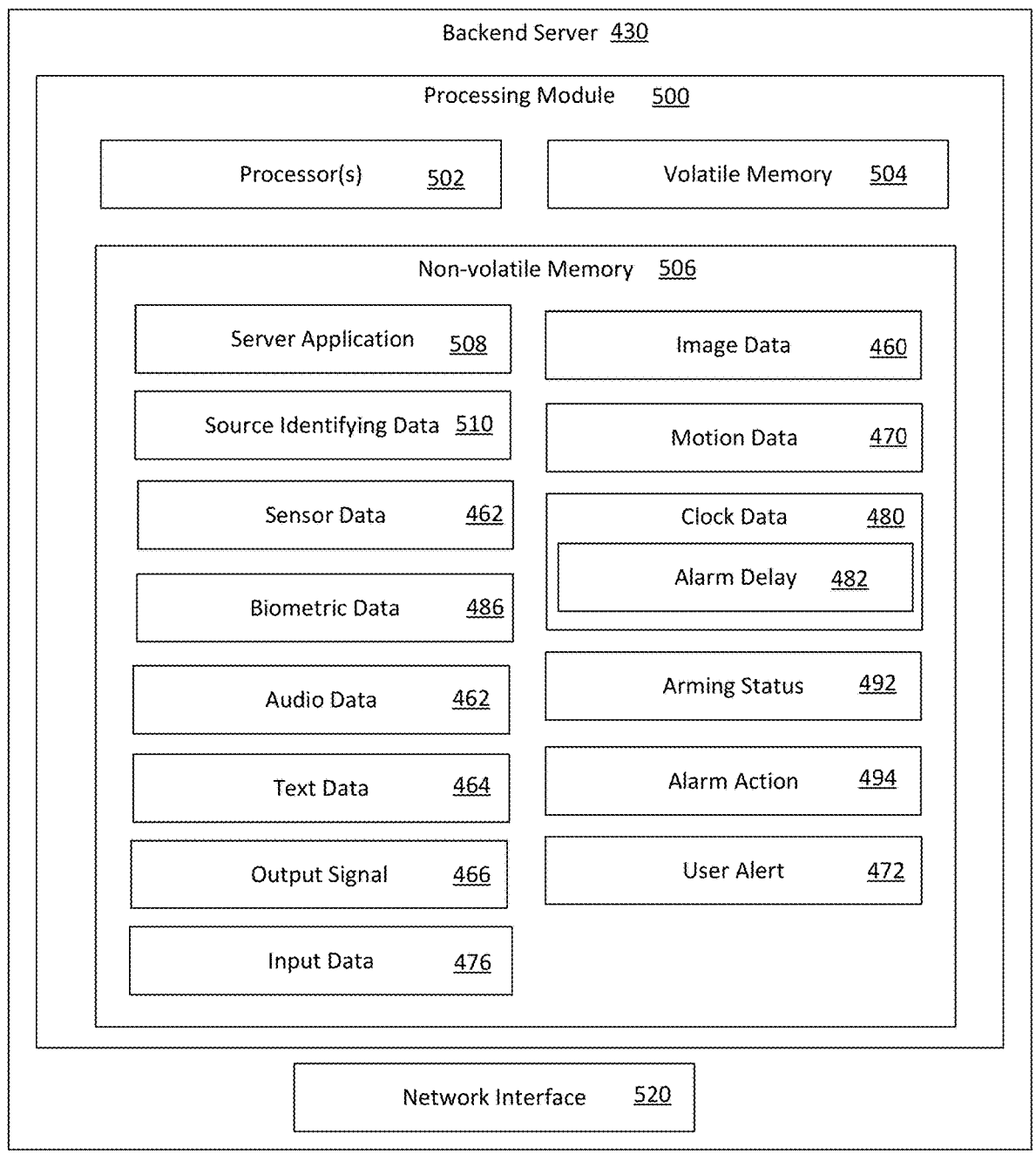
FIG. 11 is a functional block diagram illustrating one embodiment of a backend device according to various aspects of the present disclosure.

FIG. 10 is a functional block diagram illustrating an embodiment of the smart-home hub device 412 (alternatively referred to herein as the hub device 412) according to various aspects of the present disclosure. The hub device 412 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 410 for enabling remote control of the hub device 412), and/or another similar device. The hub device 412 may comprise a processing module 468 that is operatively connected to a communication module 467. In some embodiments, the hub device 412 may comprise one or more of a camera (not shown), a microphone (not shown), and a speaker (not shown). The processing module 468 may comprise a processor 469, volatile memory 473, and non-volatile memory 471 that includes a smart-home hub application 475.

In various embodiments, the smart-home hub application 475 may configure the processor 469 to receive sensor data 462 from the sensors 414 and/or the automation devices 416. For example, the sensor data 462 may include a current state (e.g., opened/closed for door and window sensors, motion detected for motion sensors, living room lights on/off for a lighting automation system, etc.) of each of the sensors 414 and/or the automation devices 416. In some of the present embodiments, the sensor data 462 may be received in response to sensor triggers. The sensor triggers may be a door opening/closing, a window opening/closing, lights being turned on/off, blinds being opened/closed, etc. As such, the sensor data 462 may include the current state of the sensors 414 and/or the automation devices 416 as well as any updates to the current state based on sensor triggers.

For example, in some of the present embodiments, when the security system 422 arming status 492 is an armed stay mode (e.g., exterior and perimeter sensors 414 armed, interior sensors 414 disarmed, and at least one resident is within the property), in response to receiving the sensor data 462 indicative of the front door at a property being opened, the hub device 412 may receive the sensor data 462 from the sensor 414 installed at the front door (e.g., a contact sensor). Once the sensor data 462 is received, the hub device 412 may analyze the image data 460 generated by the A/V recording and communication device 402 (which may be installed exterior to the front door and/or have a field of view of the area about the exterior of the front door) to determine if a person was present in the image data 460 prior to the front door being opened. If so, the hub device 412 may activate one or more of the alarm actions 494 (e.g., sounding an alarm, contacting law enforcement, generating the user alert 473 and transmitting the user alert 473 to the client devices 404, 406 associated with the security system 422, etc.). If a person was not present in the image data 460 prior to the front door opening, the security system 422 may initiate the alarm delay 482 (e.g., a ten second, fifteen second, twenty second, etc. delay) prior to activating one or more of the alarm actions 494. If the security system 422 receives a disarming action (e.g., the hub device 412 and/or one of the client devices 404, 406 receives an input of a security code, the A/V recording and communication device 402 receives a vocal and/or gesture input of a security code, etc.) prior to the alarm delay 482 expiring, the security system 422 may be disarmed without activating any alarm actions 494. As a result, an undesired activation of an alarm action 494 may be avoided (e.g., because the resident of the property may have opened the front door from the inside to perform a routine task (e.g., taking out the trash, walking the dog, getting the mail, etc.) and forgotten to disarm the security system).

The alarm actions 494 may include sounding an alarm, activating one or more of the automation devices 416 (e.g., activating the lights of a lighting automation system to flash), notifying law enforcement (e.g., by transmitting the image data 460 and/or the user alert 472, 473 to the local police), notifying the security monitoring service 418 of the security event, etc.

With further reference to FIG. 10, the smart-home hub application 475 may configure the processor 469 to receive the audio data 462, the text data 464, the image data 460, the motion data 470, the biometric data 486, and/or the user alert 472 from the A/V recording and communication device 402 (in some embodiments, via the backend server 430) using the communication module 467. For example, the hub device 412 may receive and/or retrieve the image data 460 and/or the motion data 470 from the A/V recording and communication device 402 and/or the backend server 430 in response to a sensor trigger (e.g., retrieve and/or receive the image data 460 and/or the motion data 470 from a video doorbell located exterior to the front door in response to the front door being opened when the security system 422 is in an armed stay mode).

The arming status 492, as described herein, may include an armed stay mode, an armed away mode, an armed vacation mode, a disarmed mode, and/or other modes, such as a custom mode of the user. In the armed stay mode, the sensors 414 inside the property (e.g., motion sensors) may be disarmed while the sensors 414 and/or the A/V recording and communication device 402 (or other A/V recording and communication devices) outside and along the perimeter of the property (e.g., door sensors, window sensors, video doorbells, security cameras etc.) may be armed. In addition, during the armed stay mode, at least one of the automation devices 416 (e.g., an outdoor lighting automation system) may be activated between certain hours, such as 6:00 p.m. and 4:00 a.m. In an armed away mode, the sensors 414 inside the property (e.g., the motion sensors), the sensors 414 outside and along the perimeter of the property (e.g., door sensors, window sensors, etc.), and/or the A/V recording and communication device 402 (and/or other A/V recording and communication devices, e.g., security cameras, floodlight cameras, etc.) may be armed. In addition, during an armed away mode, one or more of the automation devices 416 (e.g., interior and/or exterior lighting automation systems) may be activated according to an activation schedule (e.g., interior lights on from 5:00 p.m. to 9:00 p.m., exterior lights on from 6:00 p.m. to 8:00 p.m., blinds/shades opened from 12:00 p.m. to 5:00 p.m. and closed from 5:00 p.m. to 4:00 a.m., etc.) in order to provide an indication that somebody is home, even when they are not. In an armed vacation mode, the sensors 414, the automation devices 416, and/or the A/V recording and communication device 402 may be armed and disarmed similar to the armed away mode, however, any alerts and security events may also be sent to neighbors and/or law enforcement. In a disarmed mode, all of the sensors 414 and/or the automation devices 416 may be deactivated (other than the automation devices 416 in use by the users separate from an arming mode of the security system 422). However, in a disarmed mode, the one or more A/V recording and communication devices 402 (or other A/V recording and communication devices, e.g., security cameras, floodlight cameras, video doorbells, etc.) may be in an active state for detecting motion and/or recording activity in the field of view of the one or more A/V recording and communication devices 402 and/or other devices. In a custom mode, the user/owner of the security system 422 may configure each of the sensors 414, the automation devices 416, and/or the A/V recording and communication devices 402 (and/or other A/V recording and communication devices). For example, in a custom mode, "Summer," the user/owner may arm each of the door sensors but disable the window sensors (e.g., where windows may be left open for air flow). In addition, the user/owner may activate each of the A/V recording and communication devices in the back yard to record between 8:00 am and 5:00 p.m. (e.g., because the kids may regularly play in the back yard during the summer months).

The alarm delay 482 may be, without limitation, ten seconds, fifteen seconds, twenty seconds, or thirty seconds. In some of the present embodiments, the alarm delay 482 may be programmed by the user/owner of the security system 422. The alarm delay 482 may be different dependent on the type of security event, the arming status 492 of the security system 422, the distance of a keypad and/or the hub device 412 from the location of the sensor 414 that generated the sensor data 462, and/or other factors. For example, door open/close events may have a longer alarm delay 482 than window open/close events. For another example, the alarm delay 482 for deactivating the security system 422 in response to a door open/close event (entry/exit event) when the arming status 492 is armed away may be longer than the alarm delay 482 for deactivating the security system 422 in response to a door/open close event when the arming status 492 is armed stay and a person is not present in the image data 460 and/or the motion data 470 prior to the door open/close event.

In some of the present embodiments, the determination to disarm the security system 422 may be made by the backend server 430. In such embodiments, the backend server 430 may initiate the alarm delay 482, and if a deactivation signal is not received by the backend server 430 from the hub device 412 (and/or the A/V recording and communication device 402, in embodiments where deactivation may be in response to gesture and/or voice input, or where the A/V recording and communication device 402 includes a keypad (not shown)) prior to the expiration of the alarm delay 482, the backend server 430 may activate one or more of the alarm actions 494. In addition, in some of the present embodiments, the backend server 430 may transmit a request for one or more alarm actions 494 to the hub device 412, the A/V recording and communication device 402, and/or one or more of the automation devices 416, where the one or more requests for the alarm actions 494 are configured to activate the hub device 412, the A/V recording and communication device 402, and/or one or more of the automation devices 416 to execute the one or more alarm actions 494 (e.g., sound an alarm, flash lights, record image data, etc.).

In some of the present embodiments, the hub device 412 may analyze the sensor data 462, the image data 460, the motion data 470, and/or the audio data 462 to determine occupancy data for the property where the security system 422 is located. For example, the sensor data may include motion data from motion sensors of the sensors 414 interior to the property and/or data indicative of a light switch interior to the home being turned on/off within the last 10 seconds, 20 seconds, etc. from a lighting automation system of the automation devices 416, the image data 460 may include the presence of person(s) (e.g., in the form of the biometric data 486), the motion data 470 may include an indication of the presence of persons interior to the home (e.g., in embodiments where one of the A/V recording and communication devices 402 is indoors), and/or the audio data 462 may include voices, which may provide an indication of the presence of person(s). As a result, the hub device 412 may analyze the sensor data 462, the image data 460, the motion data 470, and/or the audio data 462 to determine the occupancy data. In some of the present embodiments, the occupancy data may be a binary determination, such as occupied and not occupied. In other embodiments, the occupancy data may be more detailed, such as identifying which residents among a plurality of residents are present, or a location of one or more of the plurality of the residents at the property. Once the occupancy data is determined, the hub device 412 may use the occupancy data to determine how to response to a sensor trigger, such as the front door being opened. For example, if, based on the occupancy data, it is determined that a person is home, when the side door is opened (and the sensor data 462 from the sensor 414 at the side door is received) and the security system 422 is armed, the hub device 412 and/or the backend server 430 may analyze the image data 460 and/or the motion data 470 generated by an A/V recording and communication device 402 having a field of view of the area exterior to and about the side door to determine if a person was present in the field of view of the device 402 prior to the side door being opened. If it is determined that a person was present, an alarm action 494 may be activated. If a person was not present, the alarm delay 482 may be initiated to allow the security system 422 to be disarmed prior to the expiration of the alarm delay 482.

FIG. 11 is a functional block diagram illustrating one embodiment of the backend server(s) 430 according to various aspects of the present disclosure. The backend server(s) 430 may comprise a processing module 500 including a processor 502, volatile memory 504, a network interface 520, and non-volatile memory 506. The network interface 520 may allow the backend server(s) 430 to access and communicate with devices connected to the network (Internet/PSTN) 410 (e.g., the A/V recording and communication device 402, the hub device 412, the client devices 404, 406, and/or a device controlled by the security monitoring service 418). The non-volatile memory 506 may include a server application 508 that configures the processor 502 to receive and/or retrieve the biometric data 486, the audio data 462, the text data 464, the alarm actions 494, the user alerts 472, 473, the arming status 492, the sensor data 462, the clock data 480, the image data 460, and/or the motion data 470 from the A/V recording and communication device 402 (e.g., in the output signal 466), and/or the hub device 412. The server application 508 may also configure the processor 502 to transmit (and/or forward) the alarm actions 494, the biometric data 486, the user alerts 472, 473, the image data 460, the motion data 470, the clock data 480, and/or the arming status 492 to the A/V recording and communication device 402, the client devices 404, 406, and/or the hub device 412 using the network interface 520.

As described herein, at least some of the processes of the A/V recording and communication device 402 and/or the hub device 412 may be executed by the backend server 430. For example, without limitation, the processor 502 of the backend server 430 may analyze the image data 460 to determine the biometric data 486 (e.g., using facial recognition) for identifying the person(s) in the field of view of the A/V recording and communication device 402, and/or may analyze the image data 460 and/or the motion data 470 in view of the sensor data 462 to determine whether a person is present in the field of view of the A/V recording and communication device 402 prior to and/or after a sensor trigger (e.g., before and/or after the front door is opened).

In further reference to FIG. 11, the non-volatile memory 506 may also include source identifying data 510 that may be used to identify the A/V recording and communication device 402, the hub device 412, and/or the client devices 404, 406. In addition, the source identifying data 410 may be used by the processor 502 of the backend server 430 to determine the client devices 404, 406 associated with the A/V recording and communication device 402 and/or the hub device 412.

In some embodiments, the server application 508 may further configure the processor 502 to generate and transmit a report signal (not shown) to a third-party client device (not shown), which may be associated with a law enforcement agency or the security monitoring service 418, for example. The report signal, which may be one of the arming actions 494, may include the biometric data 486, the image data 460, the audio data 462, and/or the text data 464. In such embodiments, an operator of the third-party client device may be able to view the biometric data 486, the image data 460, and/or the text data 464 to help in making a determination of whether a person in the field of view of the A/V recording and communication device 402 is an authorized person or suspicious person.

In the illustrated embodiment of FIGS. 9-11, the various components including (but not limited to) the processing modules 446, 468, 500, the communication modules 450, 467 and the network interface 520 are represented by separate boxes. The graphical representations depicted in each of FIGS. 9-11 are, however, merely examples, and are not intended to indicate that any of the various components of the A/V recording and communication device 402, the hub device 412, and/or the backend server(s) 430 are necessarily physically separate from one another, although in some embodiments they might be. In other embodiments, however, the structure and/or functionality of any or all of the components of each of the A/V recording and communication device 402, the hub device 412, and/or the backend server 430 may be combined. As an example, the structure and/or functionality of any or all of the components of the A/V recording and communication device 402 may be combined. In addition, in some embodiments the communication module 450 may include its own processor, volatile memory, and/or non-volatile memory. As another example, the structure and/or functionality of any or all of the components of the hub device 412 may be combined. In addition, in some embodiments the communication module 467 may include its own processor, volatile memory, and/or non-volatile memory.

Figure 12:
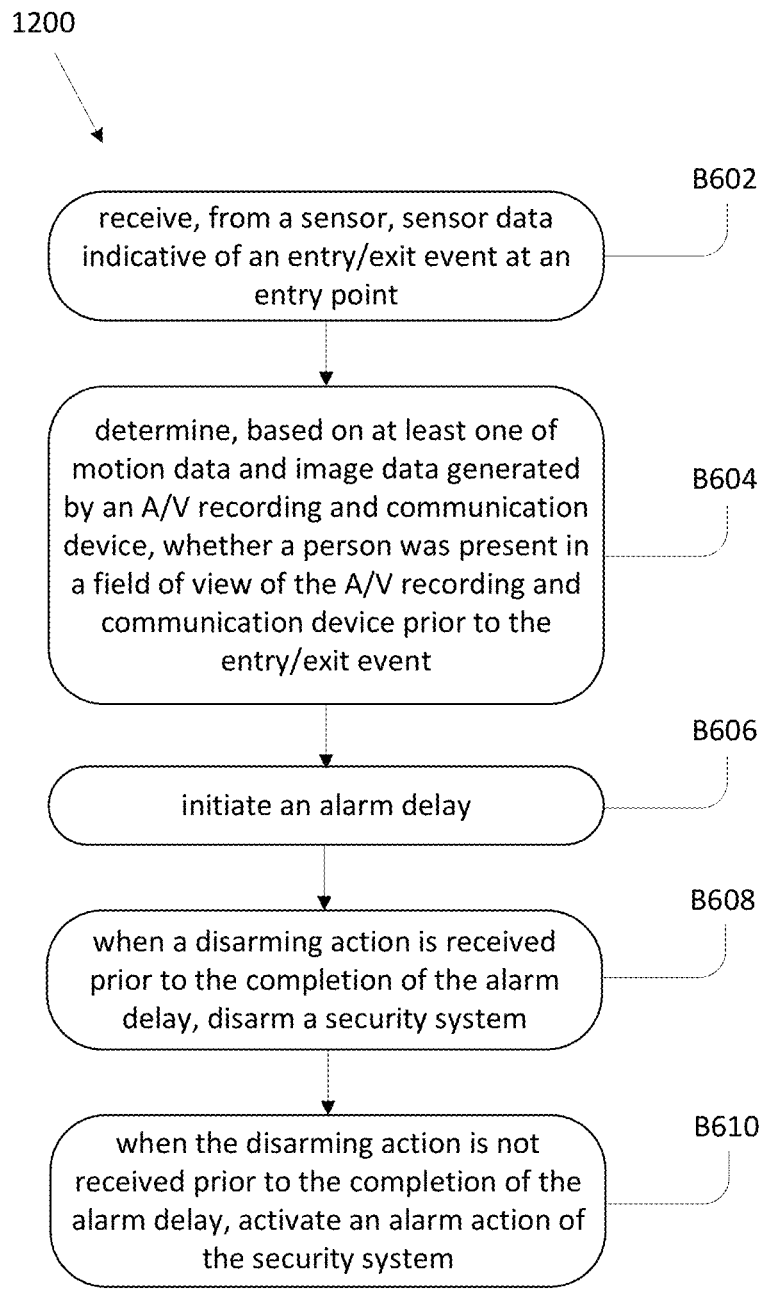
FIGS. 12-16 are flowcharts illustrating processes for activating security system alarms based on data generated by A/V recording and communication devices according to various aspects of the present disclosure.

Now referring to FIG. 12, FIG. 12 is a flowchart illustrating a process for activating security system alarms based on data generated by A/V recording and communication devices. The process 1200, at block B602, receives, from a sensor, sensor data indicative of an entry/exit event at an entry point. For example, the processor 469 of the hub device 412 using the communication module 467 (and/or the processor 502 of the backend server 430 using the network interface 520) may receive, from one or more of the sensors 414, the sensor data 462 indicative of an entry event or an exit event at an entry point to a property (e.g., at a front door, a side window, etc.). For example, in response to a door or window being opened, a contact sensor installed on a door or window of the property may transmit the sensor data 462 to the hub device 412. In some of the present embodiments, the hub device 412 may then transmit (or forward) the sensor data 462 to the backend server 430.

The process 1200, at block B604, determines, based on at least of motion data and image data generated by an A/V recording and communication device, whether a person was present in a field of view of the A/V recording and communication device prior to the entry/exit event. For example, based on the motion data 470 and/or the image data 460 generated by the A/V recording and communication device 402, the processor 469 of the hub device 412 (and/or the processor 502 of the backend server 430) (and/or the processor 452 of the A/V recording and communication device 402) may determine whether a person was present in the field of view of the camera 444 (based on the image data 460 and/or the motion data 470) and/or the field of view of the motion sensor 474 (based on the motion data 470). In some of the present embodiments, the determination may be made using computer vision (as described above) to analyze the image data 460 to determine if a person is present. In other embodiments, the determination may be made using the motion data 470, such as where the motion data 470 is indicative of the presence of a person (e.g., the voltage levels generated in response to infrared radiation levels detected by a PIR type motion sensor are indicative of the presence of a person, facial detection used to analyze the image data 460 generates the determination that a person is present, etc.). In embodiments where the motion data 470 is from motion sensors (and not the camera 444), the motion data 470 may be generated by a motion sensor of the sensors 414 such that an A/V recording and communication device 402 may not be used. For example, the motion sensor 414 may be installed near the entry point where the entry/exit event occurred (e.g., next to the entry point, on a walkway near the entry point, in the yard outside of the entry point, etc.). In such an example, the sensor data 462 may include the motion data 470.

In some of the present embodiments, in order to determine that the image data 460 and/or the motion data 470 was generated prior to the entry/exit event, the clock data 480 may be used. For example, the A/V recording and communication device 402 may generate the clock data 480 (e.g., a timestamp) for the image data 460 and/or the motion data 470 at the time of generating the image data 460 and/or the motion data 470. The clock data 480 for the sensors 414 may be generated by the sensors 414 (as part of the sensor data 462) and/or may be generated by the hub device 412 in response to receiving the sensor data 462. In any embodiment, the clock data 480 may be included in the image data 460, the motion data 470, and/or the sensor data 462, such as in the form of metadata (e.g., a timestamp). The hub device 412 and/or the backend server 430 may then analyze the clock data 480 of the image data 460 and/or the motion data 470 in view of the clock data 480 from the sensor data 462 to determine the motion data 470 and/or the image data 460 generated prior to (or after, in some embodiments) the entry/exit event.

In some of the present embodiments, the amount of time prior to the entry/exit event may be, without limitation, three seconds, five seconds, ten seconds, or fifteen seconds. In some embodiments, the amount of time prior to the entry/exit event may be configured by the user of the security system 422 (e.g., by updating the settings using a computer program application on the client devices 404, 406). For example, if the entry point where the A/V recording and communication device 402 (and/or the motion sensor) is installed faces a long walkway, the user/owner of the security system 422 may desire that the image data 460 and/or the motion data 470 generated over a longer amount of time prior to the entry/exit event be analyzed to determine if a person was present prior to the entry/exit event. On the contrary, if the walkway is short, or if there is no walkway, the amount of time desired may be shorter (e.g., because the presence of a person in the image data 460 and/or the motion data 470 would be more likely within a short time before the entry/exit event).

In some of the present embodiments, the absence of the image data 460 and/or the motion data 470 may be indicative of a person not being present. For example, because the image data 460 and/or the motion data 470 may only be generated in response to detected motion, if no motion is detected, the image data 460 and/or the motion data 470 may never be generated within the period of time prior to the entry/exit event. In such embodiments, the hub device 412 and/or the backend server 430 may determine if any image data 460 and/or motion data 470 was received and/or generated (e.g., by attempting to retrieve the image data 460 and/or the motion data 470) in the amount of time prior to the entry/exit event. For example, the hub device 412 and/or the backend server 430 may query the A/V recording and communication device 402 to determine if the device 402 was activated in the predetermined amount of time prior to the entry/exit event and/or if any image data 460 and/or motion data 470 was generated in the predetermined amount of time. In other embodiments, such as where the A/V recording and communication device 402 transmit the image data 460 and/or the motion data 470 to the hub device 412 and/or the backend server 430 automatically, the hub device 412 and/or the backend server 430 may know that no image data 460 and/or motion data 470 was generated prior to the entry/exit event because no motion data 470 and/or image data 460 may have been received.

The process 1200, at block B606, initiates an alarm delay. For example, in response to determining that a person was not present in the field of view of the camera 444 and/or the motion sensor 474 (or other motion sensor external to the A/V recording and communication device 402), the processor 469 of the hub device 412 (and/or the processor 502 of the backend server 430) may initiate the alarm delay 482. A person not being present in the image data 460 and/or the motion data 470 prior to the entry/exit event may be indicative of an exit event (e.g., a person exiting the entry point from within the property). As such, especially when the arming status 492 is an armed stay mode, a person not being present may be indicative of a resident/occupant of the property leaving the property, such as to perform a routine task, having forgot to disarm the security system 422. As such, instead of activating one or more alarm actions 494 immediately (which may be the response had a person been present in the image data 460 and/or the motion data 470 prior to the entry/exit event), the hub device 412 and/or the backend server 430 may initiate the alarm delay 482 to provide the resident/occupant a period of time to disarm the security system 422.

The process 1200, at block B608, when a disarming action is received prior to the completion of the alarm delay, disarms a security system. For example, when a disarming action (e.g., input of a security code at a keypad, scanning a fob, inputting a security code using the client device 404, 406, etc.) is received by the hub device 412 and/or the backend server 430 prior to the completion of the alarm delay 482 (e.g., prior the time of the alarm delay 482 expiring), the processor 469 of the hub device 412 (and/or the processor 502 of the backend server 430 using the network interface 520) may disarm the security system 422. In some embodiments, disarming the security system 422 may include inputting a security code (e.g., on a pin pad (of the hub device 412 and/or in communication with the hub device 412, by voice (to the hub device 412 or another device with a microphone, such as the A/V recording and communication device 402), using gestures (to the hub device 412, in embodiments where the hub device 412 includes a camera, and/or to the A/V recording and communication device 402), etc.), and the security code may be used by the hub device 412 to disarm the security system 422. In some of the present embodiments, such as where the user/owner of the security system 422 is able to use the client devices 404, 406 to disarm the security system 422, the backend server 430 may transmit (e.g., forward) a disarming request to the hub device 412 in response to receiving the disarming action from one of the client devices 404, 406, and the hub device 412 may disarm the security system 422. In other embodiments, the backend server 430 may execute the alarm actions 494 (e.g., notify law enforcement, contact the security monitoring service 418, generate a user alert, etc.), and in such embodiments, disarming the security system 422 may not require the hub device 412, but may only include the backend server 430 not executing any of the alarm actions 494.

The process 1200, at block B610, when the disarming action is not received prior to the completion of the alarm delay, activates an alarm action of the security system. For example, when the disarming action is not received prior to the completion of the alarm delay 482, the processor 469 of the hub device 412, in some embodiments using the communication module 467 (and/or the processor 502 of the backend server 430, in some embodiments using the network interface 520) may activate one or more of the alarm actions 494 of the security system 422. For example, the hub device 412 may sound an alarm, activate one or more of the automation devices 416 (e.g., a lighting automation device to flash the lights, a blind/shade automation device to open all of the blinds/shades, etc.), activate one or more of the A/V recording and communication devices 402 to record the image data 460, notify law enforcement, establish two-way communication with the security monitoring service 418, etc. As another example, the backend server 430 may notify law enforcement, notify the security monitoring service 418, activate the one or more A/V recording and communication device 402 (in embodiments where the backend server 430 and the A/V recording and communication devices 402 communicate over the user's network 408 and/or the network (Internet/PSTN) 410), etc. In some of the present embodiments, both the hub device 412 and the backend server 430 may each activate one or more alarm actions 494 (e.g., the hub device 412 may sound an alarm and the backend server 430 may notify the security monitoring service 418). In any embodiment, the hub device 412 and the backend server 430 may activate one or more alarm actions 494 in concert (e.g., the hub device 412 may generate the user alert 473 and transmit the user alert 473 to the backend server 430, and the backend server 430 may forward the user alert 473 to the client devices 404, 406).

The process 1200 of FIG. 12 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

Figure 17:
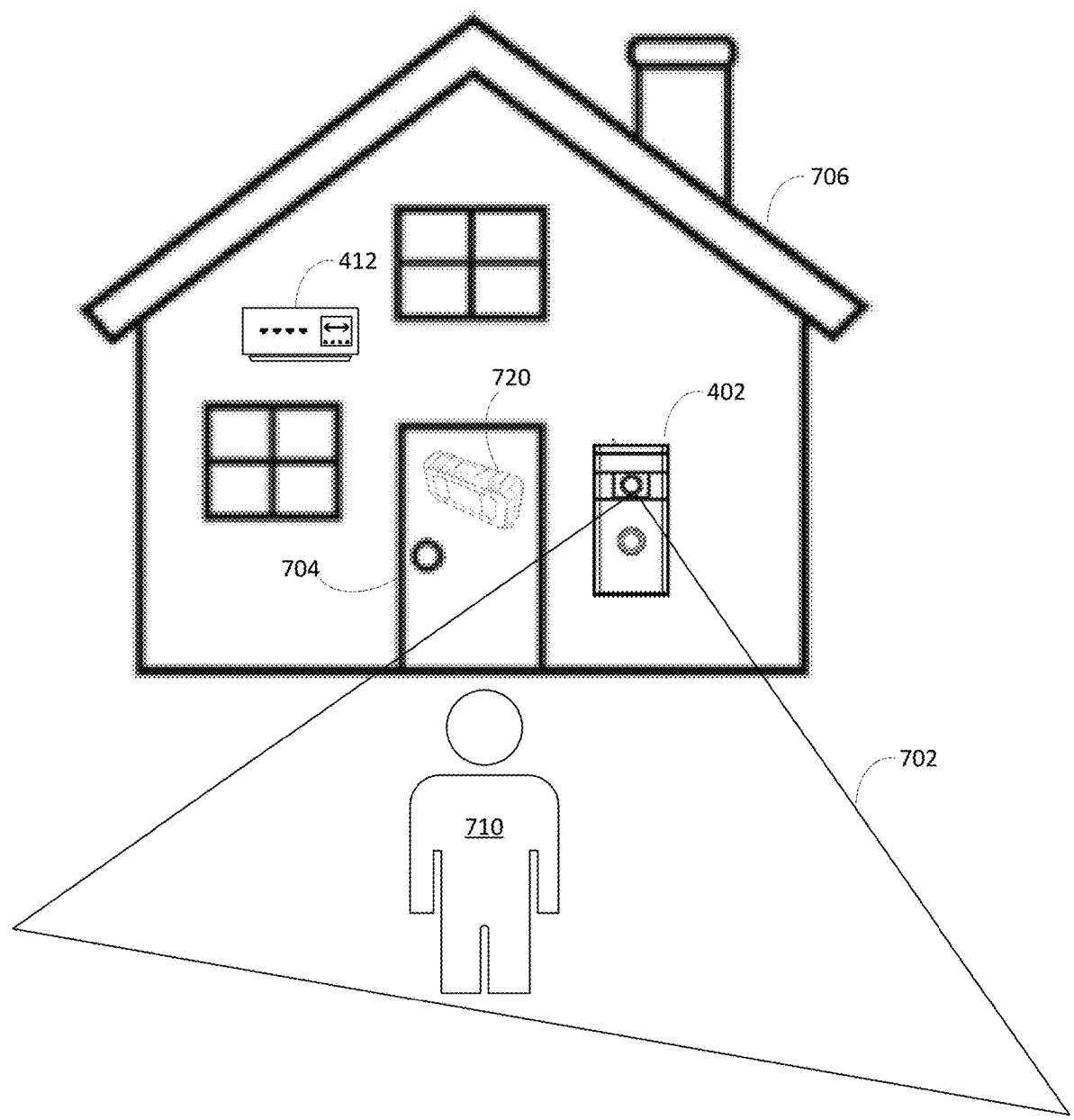
FIG. 17 is an example environment for security systems according to various aspects of the present disclosure.

With reference to FIG. 17, a home 706 where the security system 422 is installed may include the hub device 412, the A/V recording and communication device 402 (e.g., a video doorbell) having a field of view 702 (e.g., a camera field of view and/or a motion sensor field of view), and a door sensor 720 (as one of the sensors 414) installed at the door 704. The A/V recording and communication device 402 may be installed adjacent to and/or in proximity to the door 704 such that the field of view 702 (e.g., of the camera 444 and/or the motion sensor 474) includes the area exterior to the door 704, about the door 704, and/or in proximity to the door 704.

In one example, a resident of the home 706 may open the door 704 from the interior of the home 706 on his or her way to retrieve the mail, and may have forgotten to disarm the security system 422 prior to opening the door 704. The security system 422 in such an example may be in an armed stay mode. In response to opening the door 704, the door sensor 720 may generate the sensor data 462 indicative of the door 704 being opened, and transmit the sensor data 462 to the hub device 412. The hub device 412 may receive the sensor data 462 (at block B602). In some of the present embodiments, the hub device 412 may then forward the sensor data 462 to the backend server 430, and the backend server 430 may receive the sensor data 462 (at block B602). The hub device 412 and/or the backend server 430 may then determine, based on the image data 460 and/or the motion data 470 generated by the A/V recording and communication device 402 next to the door 704, whether a person was present in the field of view 702 prior to the door 704 opening (at block B604). In some embodiments, as described above, the determination may be made based on the A/V recording and communication device 402 having not been activated (e.g., the absence of the image data 460 and/or the motion data 470) prior to the door opening 704 (at block B604). Upon determining that a person was not present in the field of view 702 prior to the door 704 being opened by the resident, the hub device 412 and/or the backend server 430 may initiate an alarm delay 482 (at block B606). The resident may be notified of the alarm delay 482 by the hub device 412 and/or one of the automation devices 416 providing an audible and/or visual indication (e.g., an audible tone, a countdown, flashing lights, etc.). As a result, the resident may provide a disarming action to disarm the security system 422 (at block B608). The disarming action may include the resident providing a security code input to a keypad and/or to the hub device 412, speaking an audible code to a keypad, the hub device 412, and/or the A/V recording and communication device 402, disarming the security system 422 using the client device 404, 406 associated with the security system 422 (in some embodiments, the indication of the alarm delay 482 may be presented to the resident on the client devices 404, 406 as a notification (e.g., the user alert 473), for example), and/or providing a gesture input to a camera of the hub device 412 and/or to one of the A/V recording and communication devices 402 installed at the home 706 (e.g., the device 402). So long as the disarming action is received prior to the expiration of the alarm delay 482, the security system 422 may be disarmed (at block B608). If the disarming action is not received prior to the expiration of the alarm delay 482, the hub device 412 and/or the backend server 430 may activate one or more alarm actions 494 of the security system 422 (at block B610).

In another example, the door 704 may have been opened by the person 710. In such an example, as the person 710 approached, the A/V recording and communication device 402 may have generated the motion data 470 and/or the image data 460. As such, the hub device 412 and/or the backend server 430 may determine that the person 710 is present, and without initiating the alarm delay 482, may activate one or more alarm actions 494 (similar to that of block B610).

Figure 13:
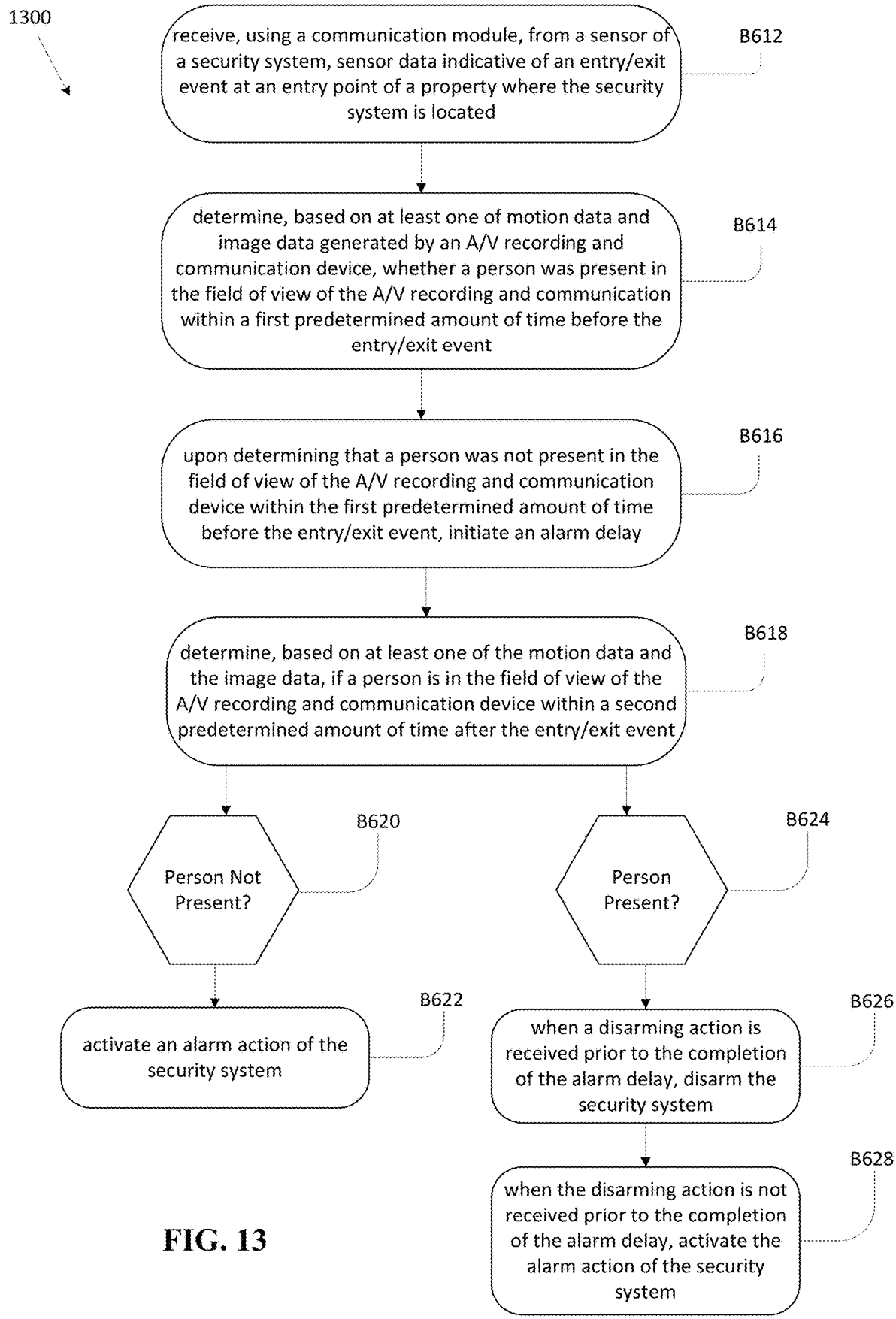

Now referring to FIG. 13, FIG. 13 is a flowchart illustrating a process for activating security system alarms based on data generated by A/V recording and communication devices. The process 1300, at block B612, receives, using a communication module, from a sensor a security system, sensor data indicative of an entry/exit event at an entry point of a property where the security system is located. For example, processor 469 of the hub device 412 using the communication module 467 (and/or the processor 502 of the backend server 430 using the network interface 520) may receive the sensor data 462 from one or more sensors 414 of the security system 422 in response to an entry/exit event at an entry point of a property where the security system 422 is located. This process may be similar to that of block B602 of the process 1200 of FIG. 12, described above.

The process 1300, at block B614, determines, based on at least one of motion data and image data generated by an A/V recording and communication device, whether a person was present in the field of view of the A/V recording and communication within a first predetermined amount of time before the entry/exit event. For example, based on the motion data 470 and/or the image data 460 generated by the A/V recording and communication device 402, the processor 469 of the hub device 412 (and/or the processor 502 of the backend server 430) (and/or the processor 452 of the A/V recording and communication device 402) may determine whether a person was present in the field of view of the camera 444 (based on the image data 460 and/or the motion data 470) and/or the field of view of the motion sensor 474 (based on the motion data 470) within a first predetermined period of time before the entry/exit event. This process may be similar to that of block B604 of the process 1200 of FIG. 12, described above.

The process 1300, at block B616, upon determining that a person was not present in the field of view of the A/V recording and communication device within the first predetermined amount of time before the entry/exit event, initiates an alarm delay. For example, upon determining (at block B614) that a person was not present in the field of view of the A/V recording and communication device within the first predetermined amount of time, the processor 469 of the hub device 412 (and/or the processor 502 of the backend server 430) may initiate the alarm delay 482.

The process 1300, at block B618, determines, based on at least one of the motion data and the image data, if a person is in the field of view of the A/V recording and communication device within a second predetermined amount of time after the entry/exit event. For example, the processor 469 of the hub device 412 (and/or the processor 502 of the backend server 430) (and/or the processor 452 of the A/V recording and communication device 402) may determine, based on the image data 460 and/or the motion data 470, whether a person is in the field of view of the camera 444 and/or the field of view of the motion sensor 474 within a second predetermined amount of time after the entry/exit event. The second predetermined amount of time may be less than the alarm delay 482, and may be an amount of time in which a person exiting the entry point may normally (e.g., within the range of an expected amount of time) enter the field of view of the A/V recording and communication device 402 upon exiting the entry point. For example, the second predetermined amount of time may be, without limitation, two seconds, three seconds, five seconds, eight seconds, or ten seconds. The second predetermined amount of time may be configured by the user/owner of the security system 422.

In some of the present embodiments, in addition to determining whether a person is present within the second predetermined period of time, a direction of movement of the person may also be determined. For example, based on the image data 460 and/or the motion data 470, if the person is determined to be moving away from the entry point, no additional action may be taken (e.g., the alarm delay 482 will continue to count down). If the person is determined to be moving toward the entry point, once this determination is made, the hub device 412 and/or the backend server 430 may activate (e.g., immediately and/or automatically) one or more of the alarm actions 494 prior to the alarm delay 482 expiring (e.g., similar to block B622, described below). In such embodiments, the determination may only be whether the first direction of movement of the person is away from the entry point (e.g., because the resident/occupant may be exiting), and if the direction of movement is later toward the entry point (e.g., because the resident/occupant realizes the security system 422 is armed and wants to disarm the security system, so he or she turns back toward the entry point), the later direction will be ignored. If the only direction of movement in the image data 460 and/or the motion data 470 is toward the entry point, the one or more alarm actions 494 may be activated.

In some of the present embodiments, in addition to determining whether a person is present within the second predetermined period of time, the image data 460 may be analyzed, using computer vision (e.g., object detection, object recognition, etc.) (as described above), to determine if the person has an authorized item. For example, it may be determined whether the person has a garbage bag (indicative of a resident/occupant taking out the trash), mail (indicative of the resident/occupant putting mail in the mail box), an animal (indicative of the resident/occupant taking the animal out for a walk), etc. If the person has authorized item, the no additional action may be taken (e.g., the alarm delay 482 will continue to count down). If the person does not have an authorized item, once this determination is made, the hub device 412 and/or the backend server 430 may (e.g., immediately and/or automatically) activate one or more of the alarm actions 494 prior to the alarm delay 482 expiring (e.g., similar to block B622, described below).

The process 1300, at block B620, may determine that a person is not present in the second predetermined period of time.

The process 1300, at block B622, activates an alarm action of the security system. For example, upon determining that a person is not present in the second predetermined period of time (at block B620), the processor 469 of the hub device 412 (and/or the processor 502 of the backend server 430) may (e.g., immediately and/or automatically) activate an alarm action of the security system. Upon activating the alarm action 494, the process 1300 may end.

The process 1300, at block B624, may determine that a person is present in the second predetermined period of time.

The process 1300, at block B626, when a disarming action is received prior to the completion of the alarm delay, disarms the security system. For example, upon determining that a person is present in the second predetermined period of time (at block B624), the processor 469 of the hub device 412 (and/or the processor 502 of the backend server 430) may, when a disarming action is received prior to the completion of the alarm delay, disarm the security system 422. This process may be similar to that of block B608 of the process 1200 of FIG. 12, described above.

The process 1300 at block B628, when a disarming action is not received prior to the completion of the alarm delay, activate the alarm action of the security system. For example, upon determining that a person is present in the second predetermined period of time (at block B624), the processor 469 of the hub device 412 (and/or the processor 502 of the backend server 430) may, when a disarming action is not received prior to the completion of the alarm delay, activate one or more of the alarm actions 494 of the security system 422. This process may be similar to that of block B610 of the process 1200 of FIG. 12, described above.

The process 1300 enables the security system 422 to determine, upon an entry/exit event, whether a person was present in the field of view of the A/V recording and communication device 402 prior to the entry/exit event. If a person was not present, this may be indicative of a resident/occupant of the property leaving the entry point, forgetting to disarm the security system 422. To double check the indication of the resident/occupant leaving having forgotten to disarm the security system 422, a determination is made of whether the resident/occupant exits the property within the second predetermined amount of time after the entry/exit event. If so, the alarm delay 482 may continue. If not, the security system 422 may determine that the indication of a resident/occupant leaving the entry point having forgotten to disarm the security system 422 may be wrong, and the alarm action 494 may be activated. The process 1300 is especially advantageous when the security system 422 is in an armed stay mode, because the process 1300 provides an additional determination of whether an entry/exit event is an entry event or an exit event, and based on that determination, either immediately and/or automatically activates one or more of the alarm actions 494 (if an entry event) or initiates the alarm delay 482 (if an exit event).

Figures 14, 15:
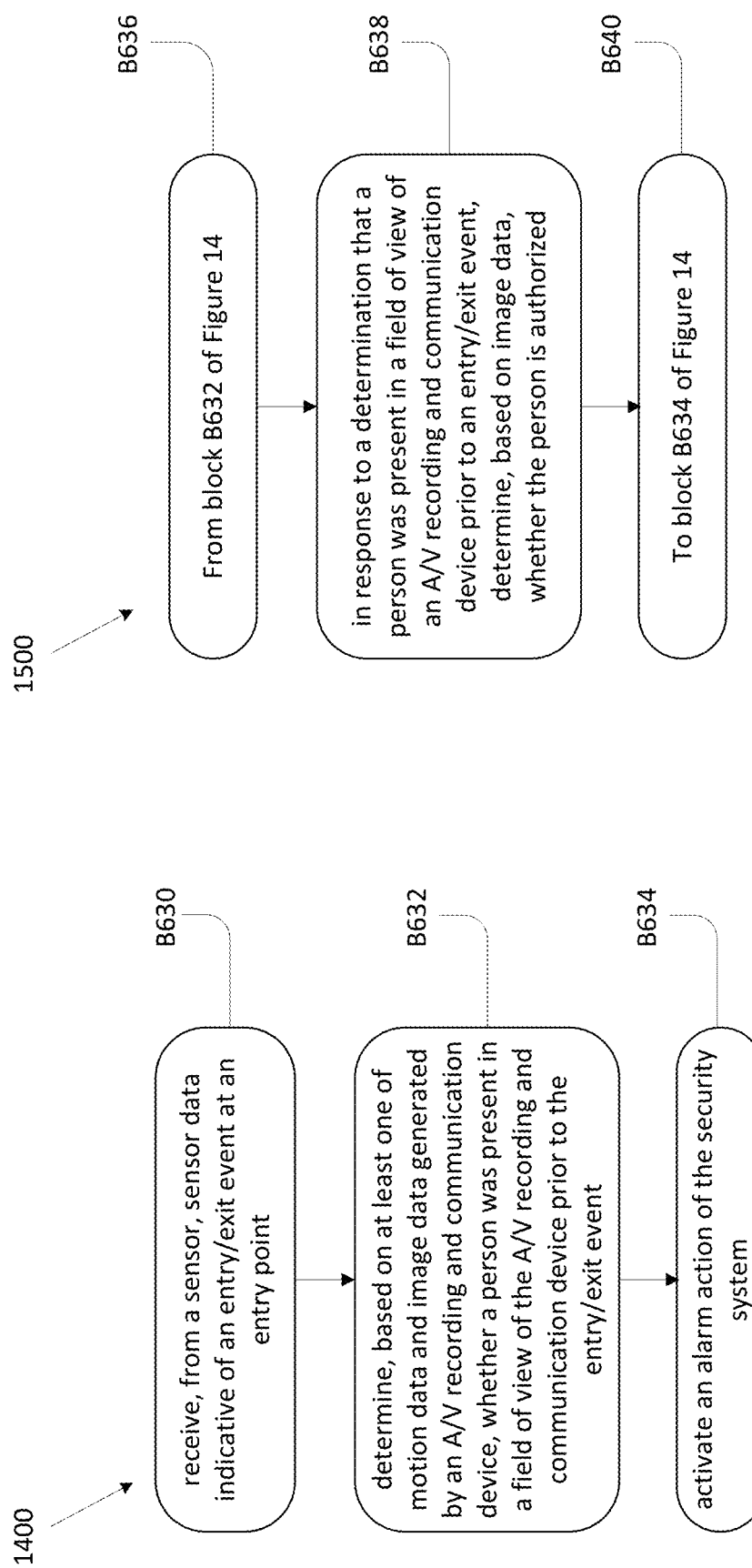

Now referring to FIG. 14, FIG. 14 is a flowchart illustrating a process for activating security system alarms based on data generated by A/V recording and communication devices. The process 1400, at block B630, receives, from a sensor, sensor data indicative of an entry/exit event at an entry point. For example, the processor 469 of the hub device 412 using the communication module 467 (and/or the processor 502 of the backend server 430 using the network interface 520) may receive, from one of the sensors 414, the sensor data 462 indicative of an entry/exit event at an entry point. This process may be similar to that of block B602 of the process 1200 of FIG. 12 and/or that of block B612 of the process 1300 of FIG. 13, described above.

The process 1400, at block B632, determines, based on at least one of motion data and image data generated by an A/V recording and communication device, whether a person was present in the field of view of the A/V recording and communication device prior to the entry/exit event. For example, the processor 469 of the hub device 412 (and/or the processor 502 of the backend server 430) (and/or the processor 452 of the A/V recording and communication device 402) may determine, based on at least one of the motion data 470 and the image data 460 generated by the A/V recording and communication device 402, whether a person was present in the field of view of the camera 444 and/or the field of view of the motion sensor 474 prior to the entry/exit event. This process may be similar to that of block B604 of the process 1200 of FIG. 12, described above.

The process 1400, at block B634, activates an alarm action of the security system. For example, upon determining that a person was present in the field of view of the camera 444 and/or the motion sensor 474 prior to the entry/exit event, the processor 469 of the hub device 412 (and/or the processor 502 of the backend server 430) may activate one or more of the alarm actions 494 of the security system 422. In such an example, because a person may be present outside of the entry point prior to the entry/exit event, it may indicate that a trespasser is present, and as a result, no alarm delay 482 may be initiated, and the hub device 412 and/or the backend server 430 may automatically and/or immediately activate one or more of the alarm actions 494 upon determining that the person was present.

Now referring to FIG. 15, FIG. 15 is a flowchart illustrating a process for activating security system alarms based on data generated by A/V recording and communication devices. The process 1500, at block B636, may continue from block B632 of the process 1400 of FIG. 14. The process 1500, at block B638, in response to a determination that a person was present in a field of view of an A/V recording and communication device prior to an entry/exit event, determines, based on image data, whether the person is authorized. For example, the process 469 of the hub device 412 (and/or the processor 502 of the backend server 430) (and/or the processor 452 of the A/V recording and communication device 402) may determine whether the person in the field of view of the camera 444 prior to the entry/exit event is authorized. For example, facial recognition (or other biometric analysis, as described above) may be used to determine if the person is authorized. In some of the present embodiments, the facial images and/or characteristics of the person may be compared against a database of authorized persons, which may be stored on the hub device 412, the backend server 430, and/or the A/V recording and communication device 402.

Upon determining that the person is authorized, the hub device 412 and/or the backend server 430 may disarm the security system 422. As a result, none of the alarm actions 494 may be activated. In some of the present embodiments, in response to determining that the person is authorized, the alarm delay 482 may be initiated by the hub device 412 and/or the backend server 430. If a disarming action is received prior to the expiration of the alarm delay 482, the security system 422 may be disarmed. If a disarming action is not received prior to the expiration of the alarm delay 482, the one or more alarm actions 494 may be activated.

In some of the present embodiments, as described herein, the security system 422 may be set to an armed stay mode (e.g., the security system 422 is armed and one or more persons is within the property). In an armed stay mode, it is especially important to the residents/occupants that the alarm actions 494 be activated automatically and immediately when the determination is that the entry/exit event is an entry event (e.g., that the image data 460 and/or motion data 470 are indicative of a person being present in the field of view of the A/V recording and communication device 402 prior to the entry/exit event) because the residents/occupants may be inside. As such, the processes 1400 of FIG. 14 and 1500 of FIG. 15 may be especially valuable for ensuring the safety of the residents/occupants when the arming status 492 is an armed stay mode. In addition, by automatically and/or immediately activating one or more of the alarm actions 494 in response to an entry event when the security system 422 is in the armed stay mode, the residents/occupants may be more likely to activate the security system 422 to the armed stay mode, even in embodiments where the security system 422 is configured to initiate the alarm delay 482 for exit events (e.g., as described above in the processes 1200 of FIG. 12 and 1300 of FIG. 13), because the entry events will trigger the immediate and/or automatic alarm actions 494, providing the residents/occupants peace of mind. The peace of mind being that not only will entry events trigger the alarm actions 494 immediately and/or automatically, but that exit events won't immediately trigger the alarm actions 494, allowing the residents/occupants time to disarm the security system 422 if they forgot to disarm the security system 422 prior to exiting.

The process 1500 of FIG. 15 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

With reference to FIG. 17, the security system 422 may be in an armed stay mode (e.g., the arming status 492 is an armed stay). In such an example, the hub device 412 and/or the backend server 430 may receive the sensor data 462 from the door sensor 720 in response to the door 704 being opened (at block B630). In response to receiving the sensor data 462, the hub device 412 (e.g., by analyzing the image data 460 and/or the motion data 470 after receiving the image data 460 and/or the motion data 470 from the A/V recording and communication device 402, and/or in response to receiving an indication of the person being present from the A/V recording and communication device 402 and/or the backend server 430), the backend server 430 (e.g., by analyzing the image data 460 and/or the motion data 470 after receiving the image data 460 and/or the motion data 470 from the A/V recording and communication device 402 and/or the hub device 412, and/or in response to receiving an indication of the person being present from the A/V recording and communication device 402 and/or the hub device 412), and/or the A/V recording and communication device 402 (e.g., by analyzing the image data 460 and/or the motion data 470 during and/or generating the image data 460 and/or the motion data 470) may determine whether the person 710 was present prior to the door 704 being opened (at block B632). Once the determination is made that the person 710 is present, the image data 460 may be analyzed by the hub device 412, the A/V recording and communication device 402, and/or the backend server 430 to determine if the person 710 is authorized (at block B638). If the person 710 is not authorized, one or more alarm actions 494 of the security system 422 may be immediately and/or automatically activated by the hub device 412 and/or the backend server 430 (at block B634). If the person is authorized, the alarm delay 482 may be initiated and/or the security system 422 may be disarmed (e.g., by the resident/occupant and/or automatically).

Figure 16:
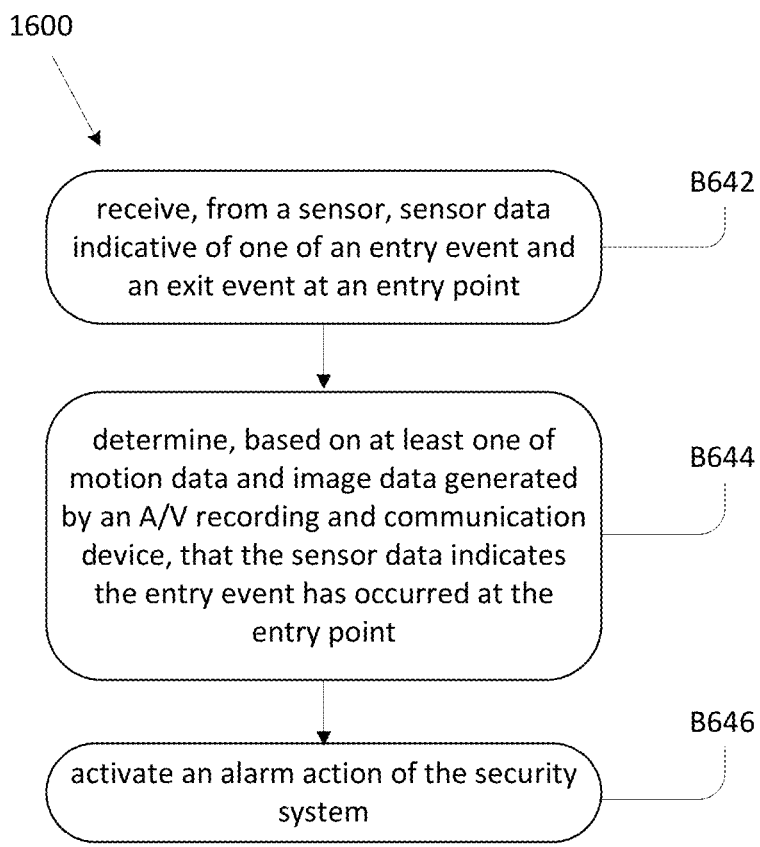

Now referring to FIG. 16, FIG. 16 is a flowchart illustrating a process for activating security system alarms based on data generated by A/V recording and communication devices. The process 1600, at block B642, receives, from a sensor, sensor data indicative of one of an entry event and an exit event at an entry point. For example, the processor 469 of the hub device 412 using the communication module 467 (and/or the processor 502 of the backend server 430 using the network interface 520) may receive from one or more of the sensors 414 installed at the entry point of a property (e.g., at the door 704 of the house 706 in FIG. 17), the sensor data 462 indicative of one of an entry event (e.g., somebody entering the entry point) and an exit event (e.g., somebody exiting the entry point).

The process 1600, at block B644, determines, based on at least one of motion data and image data generated by an A/V recording and communication device, that the sensor data indicates the entry event has occurred at the entry point. For example, the processor 469 of the hub device 412 (and/or the processor 502 of the backend server 430) (and/or the processor 452 of the A/V recording and communication device 402) may determine, based on the image data 460 and/or the motion data 470, whether the sensor data 462 is indicative of the entry event or the exit event. For example, if, based on the image data 460 and/or the motion data 470, it is determined that a person was present in the field of view of the camera 444 and/or the field of view of the motion sensor 474 prior to the entry event and/or the exit event (e.g., prior to the sensor data 462 being generated), the determination may be that the sensor data 462 is indicative of an entry event. For another example, if, based on the image data 460 and/or the motion data 470, it is determined that a person was not present in the field of view of the camera 444 and/or the field of view of the motion sensor 474 prior to the entry event and/or the exit event (e.g., prior to the sensor data 462 being generated), the determination may be that the sensor data 462 is indicative of an exit event.

The process 1600, at block B646, activates an alarm action of the security system. For example, the processor 469 of the hub device 412 (and/or the processor 502 of the backend server 430) may, in response to the determination that the sensor data 462 is indicative of the entry event, activate one or more of the alarm actions 494. In some of the present embodiments, the arming status 492 of the security system 422 may be an armed stay. In such embodiments, the security system 422 may automatically and immediately activate one or more of the alarm actions 494 once the determination of the entry event is made.

As another example, the processor 469 of the hub device 412 (and/or the processor 502 of the backend server 430) may, in response to the determination that the sensor data 462 is indicative of the exit event, initiate the alarm delay 482 and/or disarm the security system 422.

The processes 1200, 1300, 1400, 1500, and 1600, described herein, provide another determination for the security system 422 prior to activating one or more of the alarm actions 494, which may be especially valuable when the arming status 492 is an armed stay mode. For example, if the security system 422 did not have the capabilities of the processes described herein, the user/owner of the security system 422 may be more hesitant to set the security system 422 to an armed stay mode knowing that one or more of the alarm actions 494 may be activated if he or she accidentally opens a door and/or window prior to disarming the security system 422. By implementing the capabilities described in the processes 1200, 1300, 1400, 1500, and 1600, the user/owner may be more likely to activate the armed stay mode because he or she may understand that when an intruder opens the door/window, the alarm actions 494 may immediately be activated, but if the owner/user of the security system 422 (or another occupant/resident of the property) opens a door/window, they may be given at least the time of the alarm delay 482 to disarm the security system 422 and/or the security system 422 may be disarmed automatically. With this peace of mind, the user/owner of the security system 422 may be more likely to activate the security system 422, thereby increasing the safety of the home, the neighborhood, and the public safety as a whole.

Figure 18:
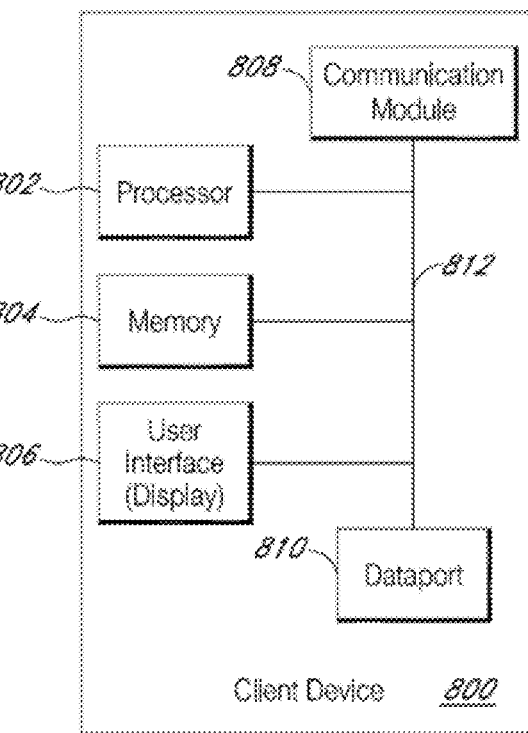
FIG. 18 is a functional block diagram of a client device on which the present embodiments may be implemented according to various aspects of the present disclosure.

FIG. 18 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 18, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random-access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 19:
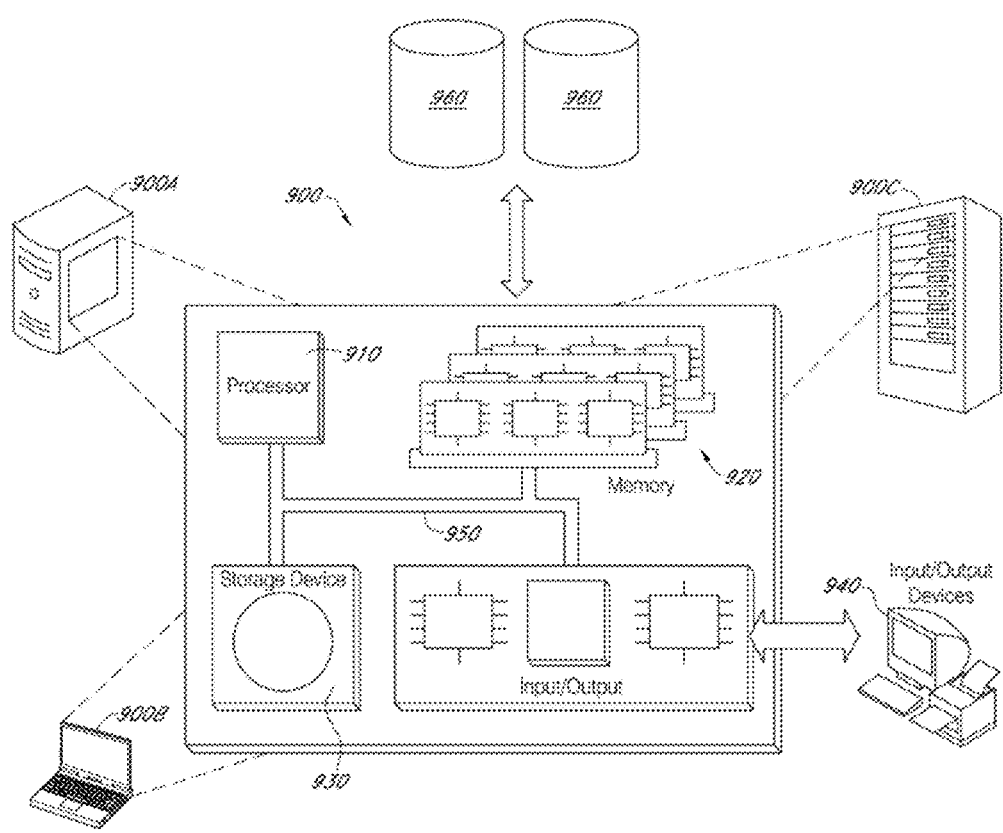
FIG. 19 is a functional block diagram of a general-purpose computing system on which the present embodiments may be implemented according to various aspects of present disclosure.

FIG. 19 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. One or more computing devices comprising:
   one or more processors;
   one or more communication interfaces; and
   one or more non-transitory computer-readable media storing instructions that, when executed by the one or more processors, cause the one or more computing devices to perform operations comprising:
   storing first data indicating that an audio/video recording and communication device (A/V device) is associated with an entry point of a property;
   storing second data indicating that a sensor is associated with the entry point;
   causing a security system to operate in a first mode;
   receiving image data generated by the A/V device;
   receiving third data indicating that the sensor detected a first opening of the entry point;

based at least in part on the receiving of the third data, determining that the image data represents a first person within a threshold amount of time prior to the sensor detecting the first opening of the entry point;
determining that an entry event occurred based at least in part on the image data representing the first person within the threshold amount of time prior to the sensor detecting the first opening of the entry point; and
based at least in part on the security system operating in the first mode and the determining that an entry event occurred, causing an alarm action of the security system to occur;
receiving fourth data indicating that the sensor detected a second opening of the entry point;
receiving additional image data generated by the A/V device;
based at least in part on the receiving of the fourth data, determining that the additional image data does not represent a second person within the threshold amount of time prior to the sensors again detecting motion;
determining that an exit event occurred based at least in part on the second image data not representing the second person within the threshold amount of time prior to the entry point again being opened; and
based at least in part on the exit event having occurred, refraining from again causing the alarm action to occur.

2. The one or more computing devices of claim 1, wherein the sensor is at least one of a contact sensor, a tilt sensor, a glass break sensor, a motion sensor, a thermostat, or a temperature sensor.

3. The one or more computing devices of claim 1, wherein the alarm action includes at least one of sounding an alarm, contacting law enforcement, contacting a security monitoring service, or sending a user alert to a user device associated with the security system.

4. The one or more computing devices of claim 1, wherein the determining that the image data represents the first person within the threshold amount time prior to the sensor detecting the first opening of the entry point comprises:
determining that the image data represents the first person at a first time;
determining, based at least in part on the third data, a second time that the sensor detected the first opening; and
determining that the first time is within the threshold amount of time to the second time.

5. The one or more computing devices of claim 1, the one or more computer-readable media storing further instructions that, when executed by the one or more processors, cause the one or more computing devices to perform further operations comprising:
determining, based at least in part on the image data, that the first person is not authorized, wherein the causing of the alarm action to occur is further based at least in part on the determining that the first person is not authorized.

6. A method comprising:
storing first data that associates a sensor with an entry point;
storing second data that associates a camera device with the entry point;
causing a security system to operate in a mode;
receiving image data generated by the camera device;
receiving third data indicating that the sensor detected a first event;
based at least in part on the receiving of the third data, determining that the image data represents a first person within a threshold amount of time prior to the sensor detecting the first event;
based at least in part on the determining that the image data represents the first person within the threshold amount of time prior to the sensor detecting the first event, causing an action associated with the mode of the security system to occur;
receiving additional image data generated by the camera device;
receiving fourth data indicating that the sensor detected a second event;
based at least in part on the receiving of the fourth data, determining that the additional image data does not represent a second person within the threshold amount of time prior to the sensor detecting the second event; and
based at least in part on the determining that the additional image data does not represent the second person within the threshold amount of time prior to the sensor detecting the second event, refraining from again causing the action to occur.

7. The method of claim 6, wherein the sensor is at least one of a contact sensor, a tilt sensor, a glass break sensor, a motion sensor, a thermostat, or a temperature sensor.

8. The method of claim 6, wherein the causing of the action to occur comprises causing at least one of sounding an alarm, contacting law enforcement, contacting a security monitoring service, or sending a user alert.

9. The method of claim 6, wherein the storing of the first data that associates the sensor with the entry point comprises storing the first data that associates the entry point with at least one of a door or a window.

10. The method of claim 9, wherein the storing of the second data that associates the camera device with the entry point comprises storing the second data that associates the camera device with the at least one of the door or the window.

11. The method of claim 6, wherein the storing of the second data that associates the camera device with the entry point comprises storing at least one of:
data indicating that the camera device is located proximate to the entry point; or
data indicating that a field-of-view of the camera device represents the entry point.

12. The method of claim 6, wherein the storing of the second data that associates the camera device with the entry point comprises storing the second data indicating that the camera device is associated with the sensor.

13. The method of claim 6, further comprising:
determining that an entry event occurred based at least in part on the determining that the image data represents the first person within the threshold amount of time prior to the sensor detecting the first event,
wherein the causing the action to occur is based at least in part on the determining that the entry event occurred.

14. The method of claim 6, wherein the determining that the image data represents the first person within the threshold amount of time prior to the sensor detecting the first event comprises:
determining that the image data represents the first person at a first time;
determining, based at least in part on the third data, a second time that the sensor detected the first event; and determining that the first time is within the threshold amount of time to the second time.

15. The method of claim 6, further comprising:
storing fourth data indicating that the action is to occur based at least in part on an entry event occurring at the entry point;
storing fifth data indicating that the action is not to occur based at least in part on an exit event occurring at the entry point; and
determining that the entry event occurred based at least in part on the determining that the image data represents the first person within the threshold amount of time prior to the sensor detecting the first event,
wherein the causing the action to occur is based at least in part on the determining that the entry event occurred.

16. The method of claim 6, further comprising:
receiving, from a user device, fourth data indicating that the sensor is associated with the entry point; and
receiving, from the user device, fifth data indicating that the camera device is associated with the entry point.

17. The method of claim 6, wherein the causing of the security system to operate in the first mode comprises causing the security system to operate in one of a home mode, an away mode, or a vacation mode.

18. The one or more computing devices of claim 1, wherein the instructions comprise instructions that, when executed by the one or more processors, cause the one or more computing devices to perform operations comprising determining whether to delay causing the alarm action of the security system to occur based on determining whether image data has been received representing a person present in the field of view of the A/V device within the threshold amount of time prior to the sensor detecting the first opening of the entry point.

19. One or more computing devices comprising:
one or more processors;
one or more communication interfaces; and
one or more non-transitory computer-readable media storing instructions that, when executed by the one or more processors, cause the one or more computing devices to perform operations comprising:
receiving image data generated by a camera;
receiving sensor data indicating that a sensor detected a first event;
based at least in part on the receiving of the sensor data, determining that the image data represents a first person within a threshold amount of time prior to the sensor detecting the first event;
based at least in part on the determining that the image data represents the first person within the threshold amount of time prior to the sensor detecting the first event, causing an action associated with a mode of a security system to occur;
receiving additional image data generated by the camera device;
receiving additional sensor data indicating that the sensor detected a second event;
based at least in part on the receiving of the additional sensor data, determining that the additional image data does not represent a second person within the threshold amount of time prior to the sensor detecting the second event; and
based at least in part on the determining that the additional image data does not represent the second person within the threshold amount of time prior to the sensor detecting the second event, refraining from again causing the action to occur.

20. The one or more computing devices of claim 19, wherein the sensor is at least one of a contact sensor, a tilt sensor, a glass break sensor, a motion sensor, a thermostat, or a temperature sensor.

21. The one or more computing devices of claim 1, wherein the action includes at least one of sounding an alarm, contacting law enforcement, contacting a security monitoring service, or sending a user alert to a user device associated with the security system.

22. The one or more computing devices of claim 1, wherein the determining that the image data represents the first person within the threshold amount time prior to the sensor detecting the first event comprises:
determining that the image data represents a first person at a first time;
determining a second time that the sensor detected the first event; and
determining that the first time is within the threshold amount of time to the second time.

* * * * *